United States Patent [19]

Rohatyn

[11] Patent Number: 4,672,298
[45] Date of Patent: * Jun. 9, 1987

[54] POWER FACTOR CORRECTION SYSTEM

[76] Inventor: Frederick Rohatyn, 166-10, 15th Drive, Beechhurst, N.Y. 11375

[*] Notice: The portion of the term of this patent subsequent to Nov. 19, 2002 has been disclaimed.

[21] Appl. No.: 799,162

[22] Filed: Nov. 18, 1985

Related U.S. Application Data

[63] Continuation-in-part of Ser. No. 480,496, May 6, 1983, Pat. No. 4,554,502.

[51] Int. Cl.$^4$ .............................................. G05F 1/24
[52] U.S. Cl. .................................... 323/208; 323/256; 323/260
[58] Field of Search ........ 323/205, 208, 233, 255–256, 323/259–260, 262, 340–342, 344, 352, 361

[56] References Cited

U.S. PATENT DOCUMENTS 4,438,387 3/1984 Rohatyn .............................. 323/260
4,554,502 11/1985 Rohatyn .............................. 323/208

Primary Examiner—Peter S. Wong
Attorney, Agent, or Firm—Erwin S. Teltscher

[57] ABSTRACT

A power-factor correction system for reactive power control and concomitant power factor correction adapted to cooperate with a line supplying power at a given line voltage from a power generator to an inductive load via a given path, includes a reactive power compensating device in shunt with the line supplying power, and is adapted to be connected in shunt with the inductive load. The reactive power compensating device, in turn, includes a fixed capacitance and a voltage applying circuit delivering a voltage of continuously variable magnitude in a stepless manner to the fixed capacitance in response to any change in lagging reactive power consumed by the load, so as to correct the magnitude of the power factor in the line supplying power to the inductive load to a sensed optimum correction value, as a result of the power compensating device generating thereacross a resulting compensating reactive power in proportion to the square of the voltage of variable magnitude delivered to the fixed capacitance so as to at least partly off-set the lagging reactive power, whereby power factor correction is optimized, yet does not produce any transient. The power-factor correction system is further capable of regulating the magnitude of the compensating reactive power to achieve optimization for line voltages having waveforms deformed from a sinusoid of the fundamental frequency and for non-linear loads. The system is also arranged to prevent destructive series resonance between a transmission line and the fixed capacitance.

30 Claims, 14 Drawing Figures

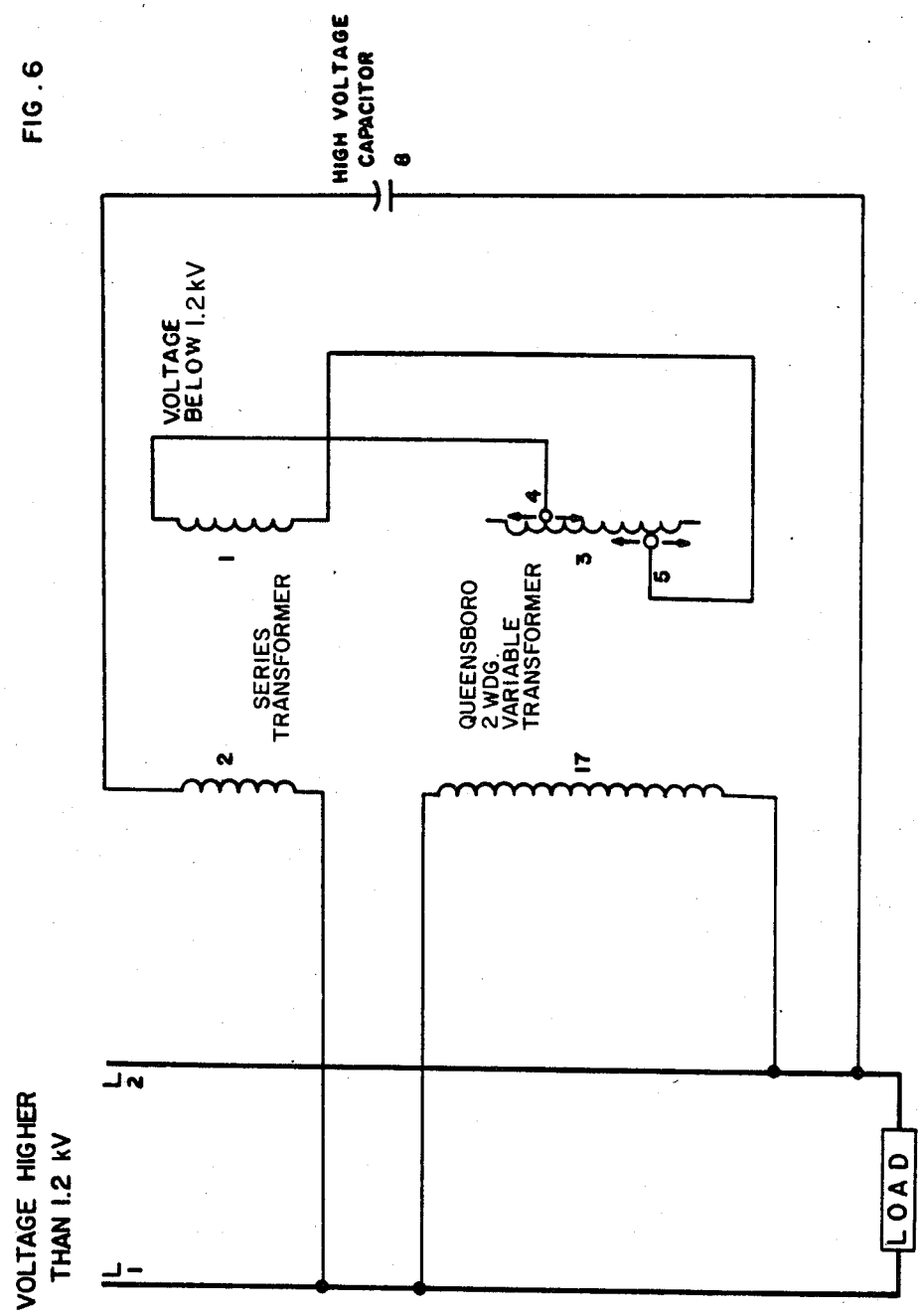

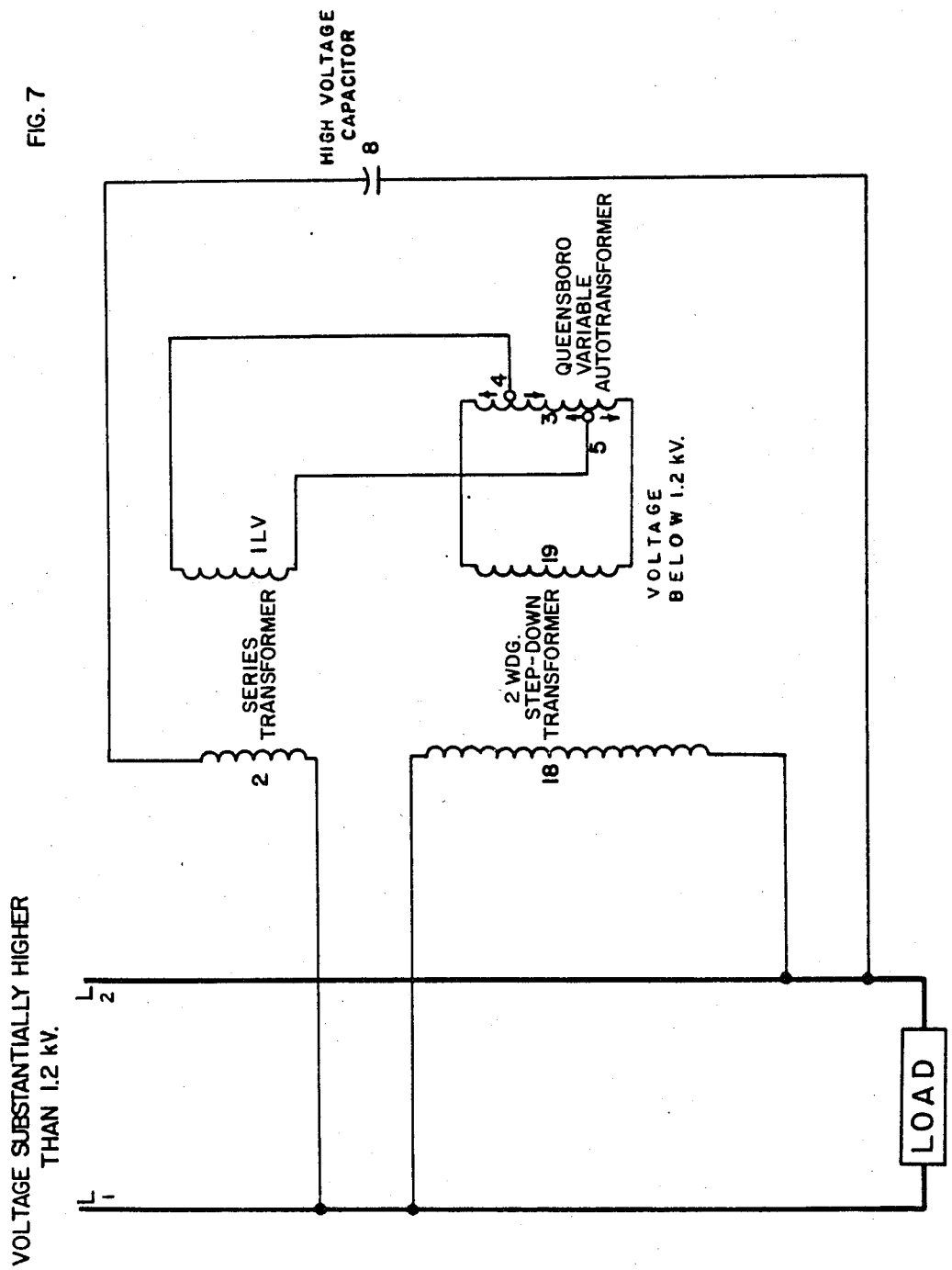

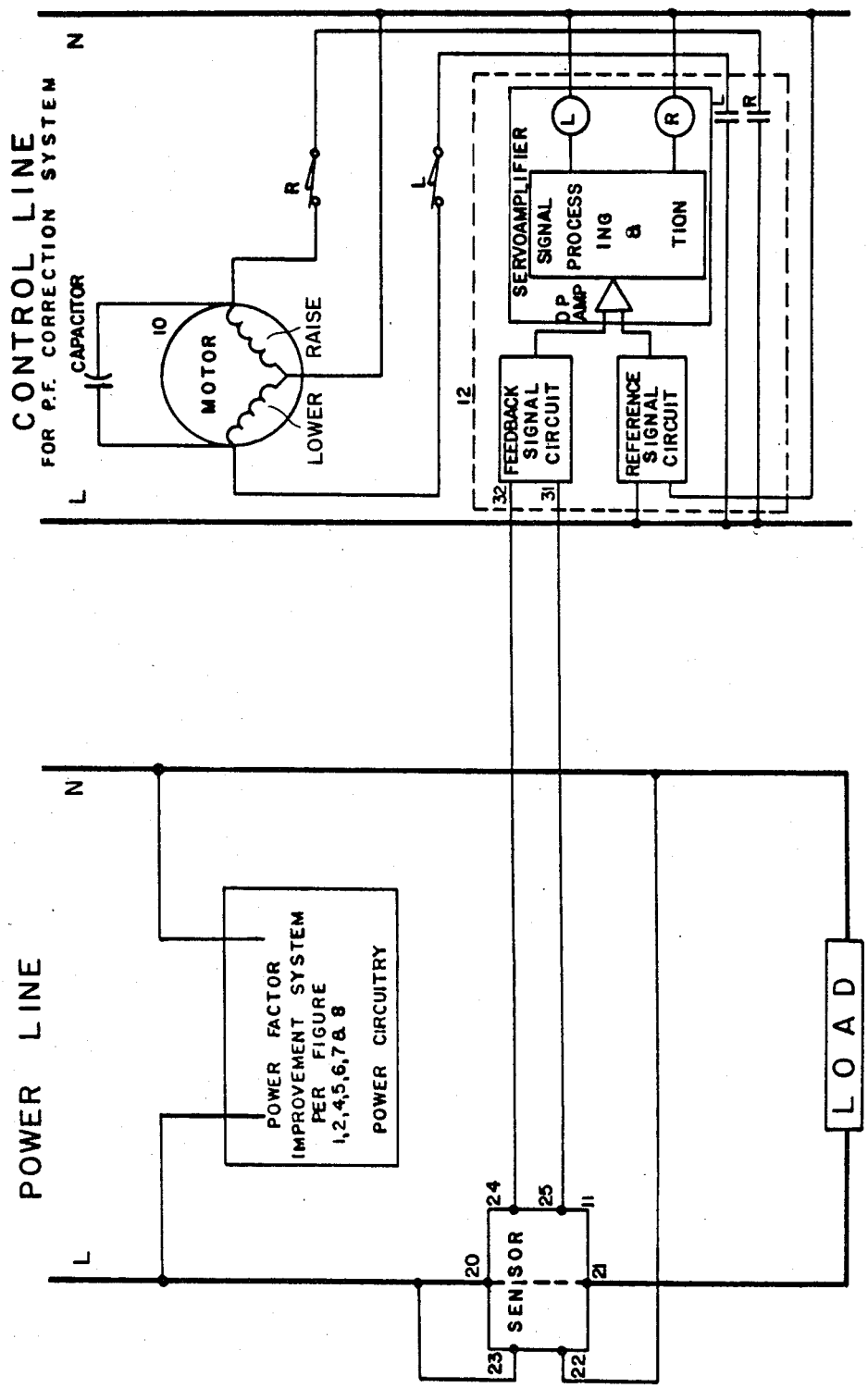

POWER FACTOR CORRECTION SYSTEM

REFERENCE TO RELATED APPLICATION

This application is a continuation-in-part application of application Ser. No. 480,496, filed on May 6, 1983 now U.S. Pat. No. 4,554,502.

The following relates to continued developments for conditioning service lines from utility companies as in my application Ser. No. 271,202, filed June 8, 1981, now U.S. Pat. No. 4,438,387, as well as my application Ser. No. 579,119, filed on Feb. 10, 1984, now abandoned, which are incorporated herein in their entirety by reference.

BACKGROUND OF THE INVENTION

The generally accepted method for compensating a lagging power factor reactance of an inductive load is by capacitors which provide a leading power factor.

In order to achieve an ideal compensation, the magnitude of the compensative leading reactive power should be made equal to the magnitude of the existing lagging reactive power, otherwise the system becomes undercompensated or overcompensated. In order to achieve an acceptable degree of closeness to the ideal compensation, it has been proposed, in the prior art, to subdivide the required total shunting capacity into a plurality "n" of capacitors, which are paralleled 1, 2, 3, . . . n by switching the capacitors into and out of circuit. The mentioned capacitor switching technique dates from before 1918; using mainly from six to nine parallel capacitors, switched by contactors whose coils are energized and de-energized by an automatic control circuitry activated by the sensing of either the power factor or the ratio of the leading to lagging reactive current or reactive power.

One great disadvantage of the capacitor switching technique is that it compelled one to compromise at a degree of compensation which deviates undesirably from the ideal value, or even from an acceptable value. When using six capacitors, for example, the deviation would amount to 1/12 of the compensable value.

In the prior art there existed fear of the so called over-improvement, a name given to a power factor correction better than 0.9. With the combination of increments in sizable capacitor steps and abrupt full current switching, over-improvement could cause overvoltages of as much as 40% on the affected power lines and subsequent damage to motor driven equiptment under certain conditions of operation.

Another disadvantage is in the capacitor switching itself. With every capacitor being switched, a surge, a spike or the like results, causing a perceivable flicker which is extremely detrimental to sensitive critical electronic loads connected to the line. In fact, capacitor switching is a primary cause of trouble in computers receiving power from lines. True, in the capacitor switching systems today, switching is made at zero voltage crossing, but this feature achieves little, because in capacitors when the voltage curve is at zero, the current curve is at the peak and vice versa.

Even in absence of sensitive electronic loads, the prior art which uses capacitor switching, which is a rough and violent physical action, frequently results in capacitor fuse blowing. This causes watt losses, kilowatt demand increases, operational expenses during any interim until those fuses are replaced.

Another trouble occurs with the prior art when the load on the power lines consists of rectifiers, and particularly of rectifiers with forced commutation, which as it is known, generate a very substantial reactive power component and also very substantial 5th, 7th and 11th harmonics. Danger exists that at a certain switching stage with the rectifier transformer winding a resonant circuit whose frequency closely coincides with the frequency of the 5th or other odd harmonic, making the current increase dangerously uncontrollable.

Another disadvantage of the prior art was that the capacitors had to be furnished with discharging resistances. When there was a power failure, or power disconnection, or a fuse blowing—and fuses blew frequently, the circuit had no path of discharge through anywhere, and without the discharge resistors, the capacitors would explode at the next energization, when added to the existing charge. These discharge resistors have the disadvantage of having certain cost, but more importantly, they consume energy incessantly.

Another disadvantage of the prior art consists in the inability of recession of the bottom portion of the reactive power correction range. When the magnitude of a corrective reactive power is being studied, the upper limit which is the highest leading reactive power, is exactly determined. As to the lowest reactive power ever needed, seldom values lower than 40% of highest reactive power are necessary. Yet in the prior art the bottom of any corrective reactive power range is always zero, which in addition to being unnecessary is inconvenient.

Another disadvantage of the prior art consists in the fact that the capacitors work at all the times at their full rated voltage, and at certain switching instances the peak voltage is enhanced beyond the rated peak voltage of the capacitors which can destroy or reduce the life time of these circuit components.

This invention increases and decreases the compensatory reactive power of the electrical system instead of a process of adding and/or subtracting capacitors, by raising and/or lowering the voltage applied to a capacitor or capacitors. It may be seen that the compensating reactive power change is proportional to the square of the voltage applied to the capacitors; by comparison, the prior art uses capacitor size change, whose effect is proportional to only the first power of the capacitor size.

SUMMARY AND OBJECTS OF THE INVENTION

This invention has as its first objective the provision of a shunt compensation system for power and transmission lines to correct lagging reactive power and subsequently also to improve lagging load power factor. This is exactly the same objective as the objective of the prior art capacitor switching system, the air being to maintain this advantage without retaining its disadvantages.

A further object of this invention is to provide a device as characterized as above, in which the magnitude of the compensatory reactive power applied to the traditional capacitors is modulated rather than the known prior art technique of abruptly adding or subtracting capacitors which intrinsically involve surges, spikes or the like.

A further object is to provide a device which benefits from the effect of the circuitry that allows corrective reactive power change to be proportional to the square of the voltage applied to the capacitors in contrast to the prior art which merely uses capacitor size change, in which the associated effect is proportional only to the first power of the capacitor size.

A further object of this invention is to provide a device as characterized as above which suitably conditions the voltage which the capacitor receives in such a manner that the capacitor's rated peak voltage is only seldom reached and most of the time the voltage applied to the capacitor is kept substantially below the rated voltage, making the capacitor life to be practically eternal.

A further object of this invention contemplates providing the device as characterized as above which is extremely reliable in construction and durable in use.

The most important object of this invention contemplates a device as set forth above which while providing to the power lines cancellation of lagging reactive power and consequently improvements of the power factor, and subsequently substantial reduction in kilowatt demand and watt losses,—it will in no way affect sensitive electronic equipment connected to the pertaining power lines; said electronic equipment which includes computers, Cat Scans, military and communication equipment belonging to the critical load category will operate with no failures, no curtailing of life, no (computer) errors.

A further object of the invention provides a device which in spite of the incomparably superior performance will be competitive in cost with devices of the prior art. In order to achieve this object, this invention provides a device which as one of the measures allows the use of capacitors having a higher rated voltage than the rated voltage of the affected power lines.

A further object of this invention is to provide a device characterized as above which permits reaching the theoretical optimum of power factor improvement, i.e. reaching unity power factor without incurring the hazard of thereby generating over voltage, without incurring the danger of damage to motor driven equipment fed from the affected power lines.

A further object of this invention is to provide a device characterized as above, in which capacitor protection by means of a fuse, though not prohibited, is unnecessary; and when a fuse is inserted in the capacitor circuit, its likelihood of ever blowing is nil, which is a feature which saves energy, reduces the kilowatt demand and maintenance cost.

A further object of this invention is to provide a device characterized as above which would not produce over voltages at times of power return after a power interruption.

A further object of this invention is to provide a principal applicable to any alternating current voltage class, any technical power line frequency, any power line number of phases.

A further object of this invention is to regulate the magnitude of the compensating reactive power to achieve optimization not only for such power lines which deliver sine wave voltages, but also for the usual present-day transmission lines delivering voltages having wave forms deformed from a sinusoid of fundamental frequency. Likewise the object is to regulate the magnitude of the compensating reactive power to achieve optimization not only in cases in which the power loads are linear, but also for present-technology cases, when the loads are non-linear.

A further object of this invention with non-sinusoidal applied voltages, and/or non-linear loads, in which the power factor of one frequency is no longer an unambiguous criterion, is control so as to minimize losses upstream of the load (lines), minimization of the power demand, and maximization of the available real power.

A further object of this invention is to take into account the reactance of the incoming transmission line, and to avert formation of a series resonance of that lagging reactance of the transmission line with this system's compensatory leading reactance at any of the harmonic frequencies which the transmission lines may carry.

While the inventive system is primarily meant to be utilized for the compensation of a lagging reactive power by a leading reactive power in order to correct the power factor of the feeding power line, it can be adapted to work in reverse. A transmission line which has a leading power factor can have its power factor corrected by making the present inventive system to be a manually/automatically regulated lagging reactive power.

These and other objects will be made manifest when considering the following detailed specification taken in conjunction with the accomanying drawing figures.

BRIEF DESCRIPTION OF THE DRAWINGS

FIG. 5 is the same diagram as Figure 1, except that a 2-winding isolated transformer is inserted in lieu of the pre-boost autotransformer.

FIG. 6 refers to a case where the power lines are high voltage, typically not exceeding 15 kV. The circuitry is once again an adaptation of FIG. 1, in which the variable transformer is a 2-winding isolated transformer.

FIG. 7 pursues the same purpose as FIG. 6, and constitutes an alternative adaptation of FIG. 1. FIG. 7 uses a low voltage variable autotransformer as in FIG. 1, but said low voltage variable autotransformer is fed from the high voltage lines through the intermediary of a 2-winding isolating transformer. Both FIG. 6 and FIG. 7 are shown, because in certian applications system FIG. 6 may be more advantageous, in other applications system FIG. 7 may be more economical.

FIG. 8 delineates a system in greater detail representative of the control systems for FIGS. 1-7.

In cases in which the inventive system is to be utilized to correct a leading power factor of a feeding transmission line, on diagrams FIGS. 1, 2, 3, 4, 5, 6, 7—element 8 will no longer be a capacitor as shown, but a reactor of an aproppriate kVAR size and rated highest available shunt voltage in the circuit.

Figure 1:
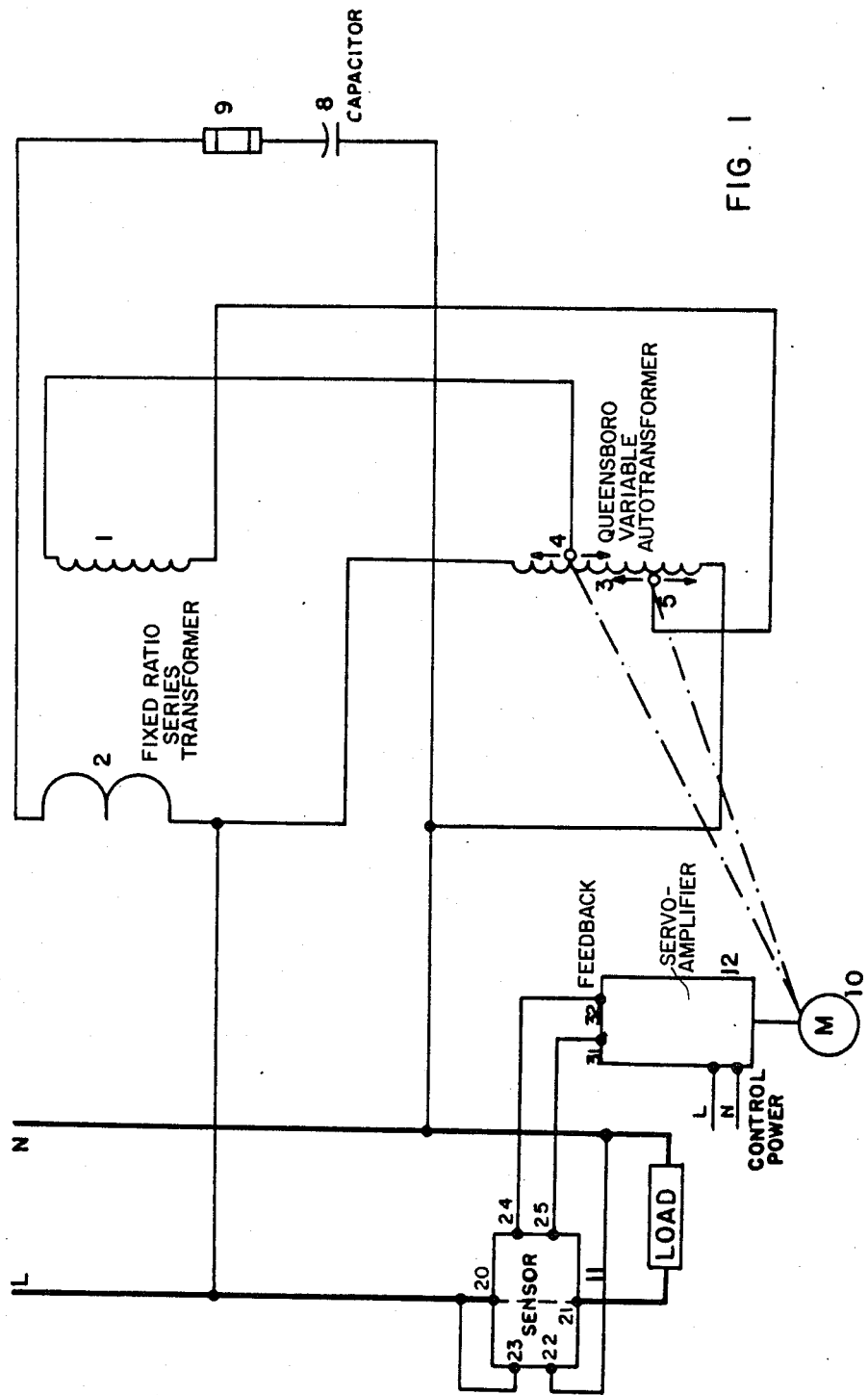
FIG. 1 shows the basic schematic of the apparatus according to the present invention which operatively conditions an alternating current single phase system.
Figure 11:
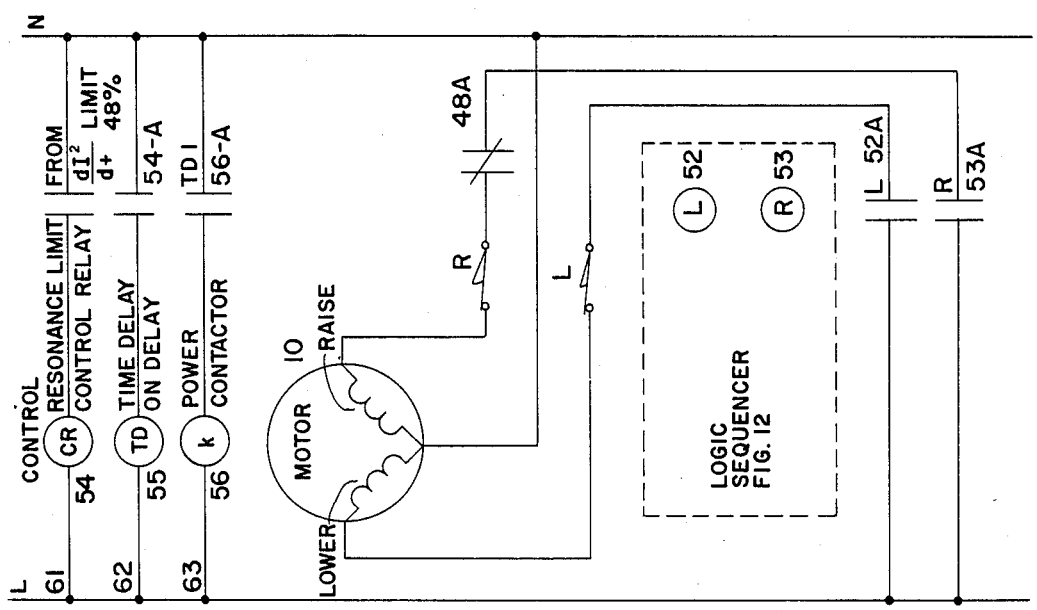
Figure 10:
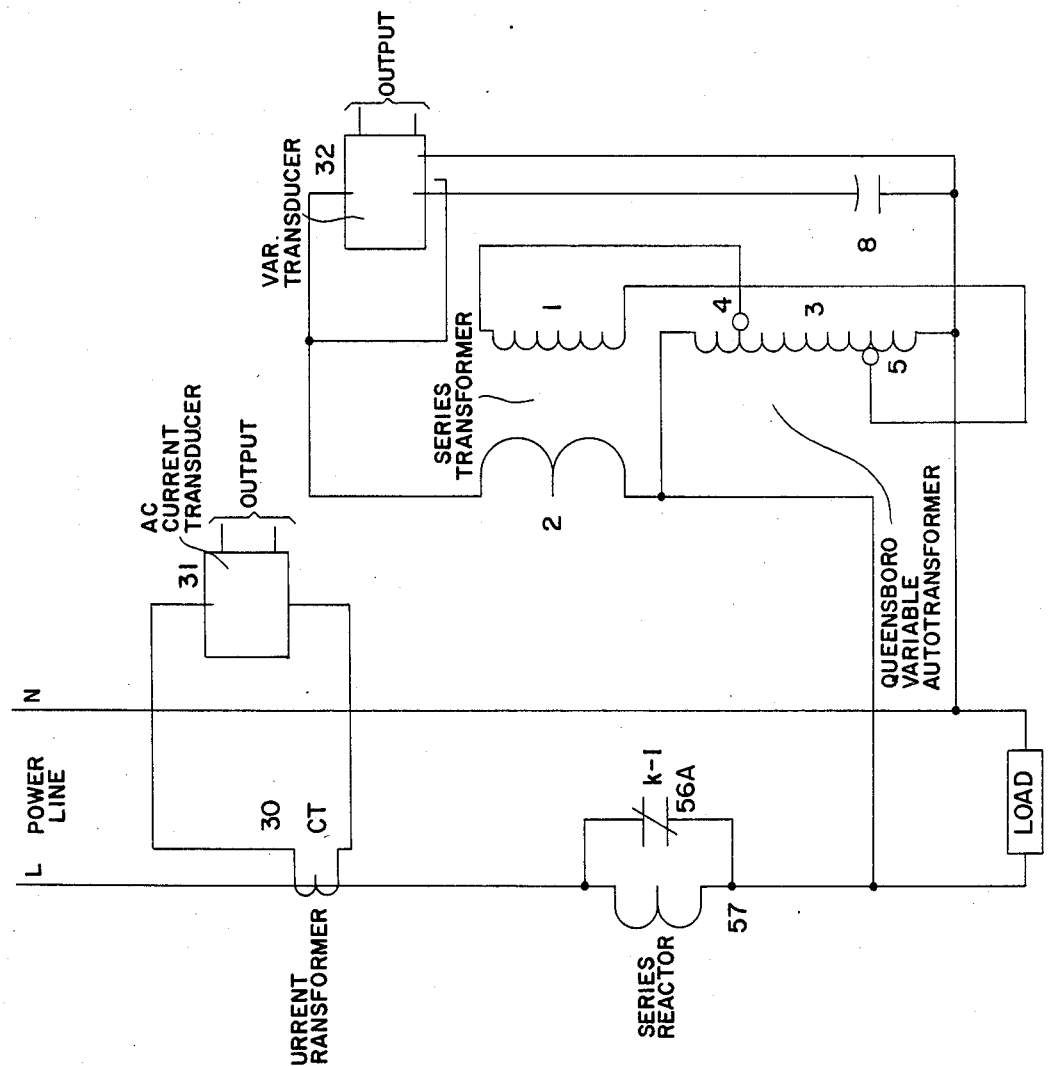
Figure 12:
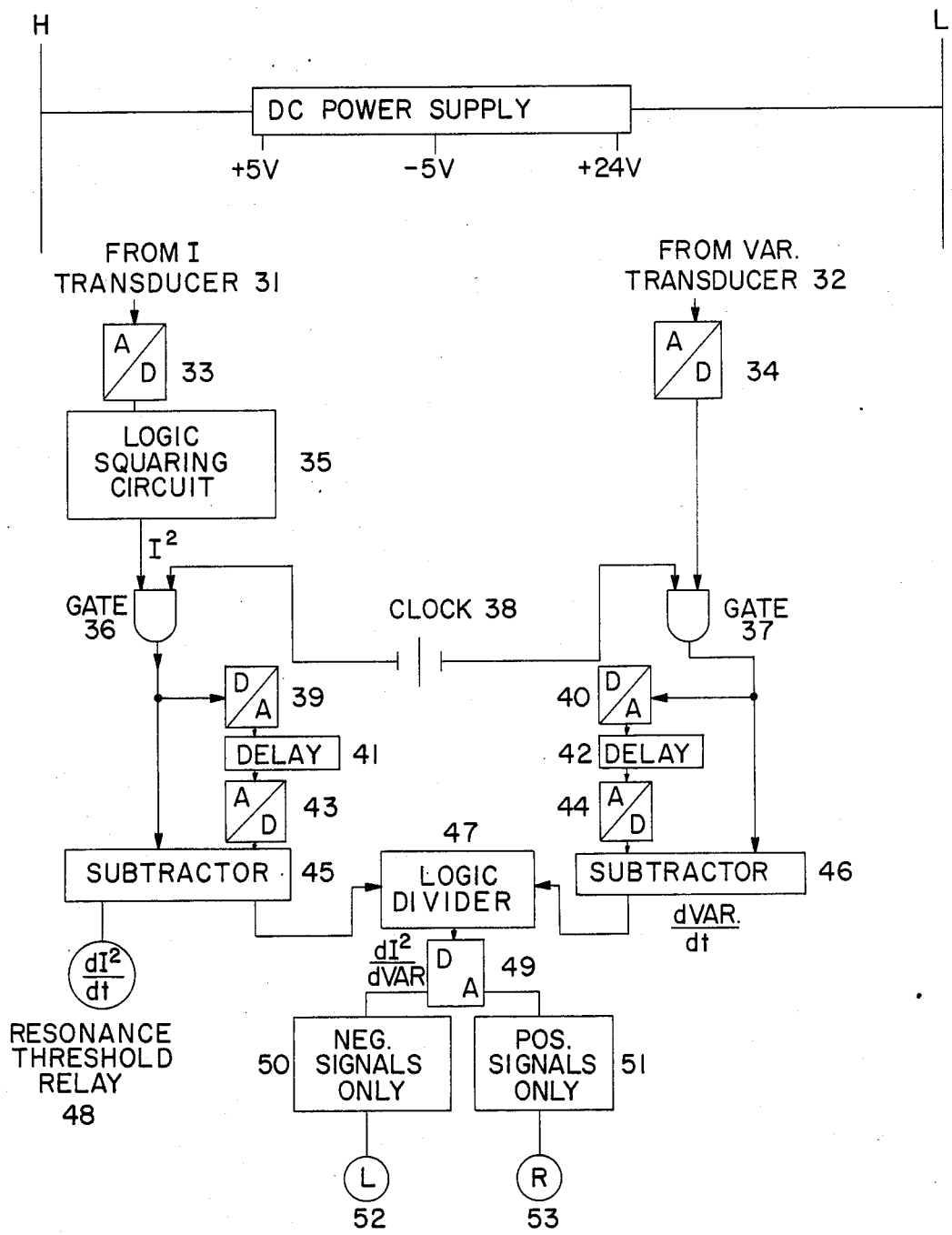
Figure 13:
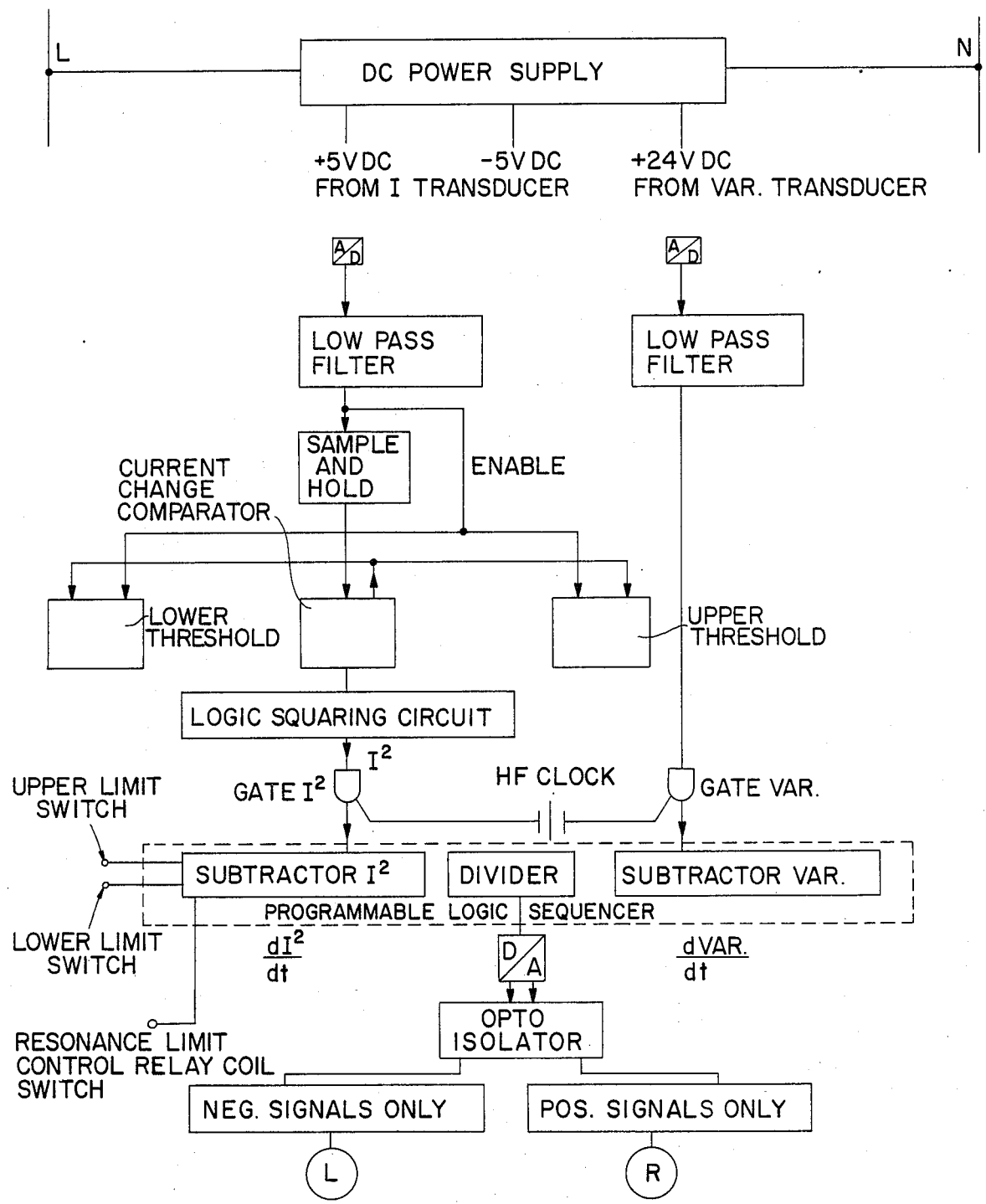
Figure 14:
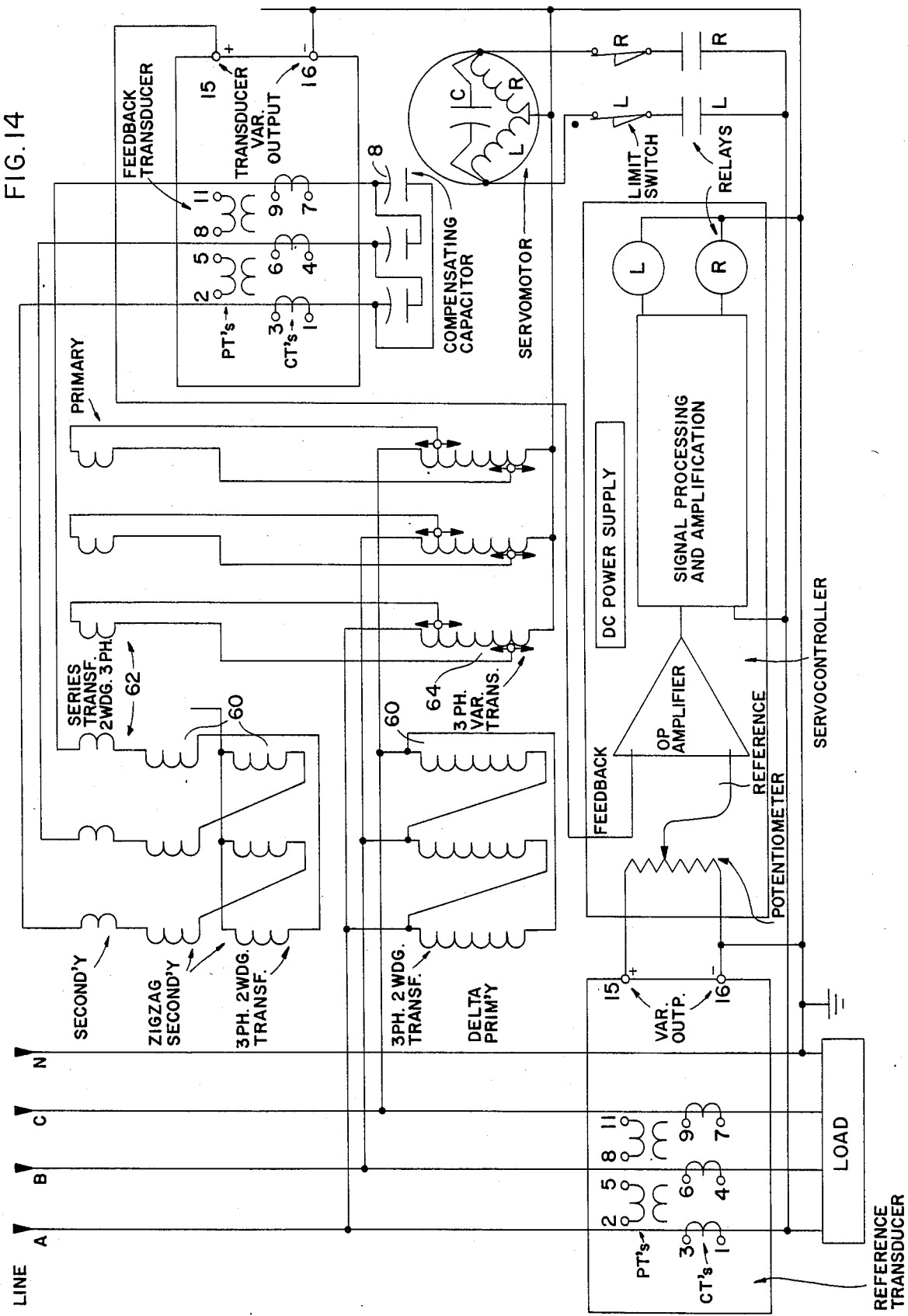

FIG. 10 is basically the schematic of FIG. 1, adapted for non-sinusoidal voltage feeding, and/or non-linear loads, and arranged to also cope with the danger of any possible resonance of harmonics contained in the voltage source, combined with the modulated capacitor feeding voltage, in the process of being increased;

FIG. 11 is a control circuit diagram following FIG. 10, and preceding FIG. 12;

FIG. 12 is a block diagram of a circuit to obtain the derivative of the squared current divided by the derivative of the wattless power;

FIG. 13 is an alternate block diagram to obtain the derivative of the squared current divided by the derivative of the wattless power and FIG. 14 is a further alternate, and somewhat less expensive control system.

BRIEF DESCRIPTION OF THE PREFERRED EMBODIMENT

Methodology of Control

As already mentioned, power factor problems became important already around 1918. Until relatively recently, the conccern was to obtain lines delivering a reasonably clean sine wave voltage and reasonably linear loads, which have still today their importance. Let us call the methodoloy this invention uses to control power from sine wave sources—linear loads—to be Methodology A.

In recent years, however more and more sources supply non-sinusoidal voltages and have non-linear loads. Let us call the methodology this invention uses to control power from non-sinusoidal voltage sources, having linear or non-linear loads to be Methodology B.

Let us add a suffix to the methodology:
for single phase systems 1
for 3 phase systems with reasonably balanced loads 2
for 3 phase systems with loads totally out of balance 3

Methodology A1

The methodology refers to FIGS. 1, 2, 4, 5, 6, and 7 in the drawing. The control is illustrated on FIG. 8. and described in what follows. In this methodology the (mostly lagging) reactive power contained in the load current circuit is picked up by sensor 11 and is utilized as the feedback signal at the servoamplifier 23, which at its output controls the positioning of servomotor 10, which positions the current collectors of the variable transformer 3, and determines the compensable reactive power.

Methodology A2

Figure 3:
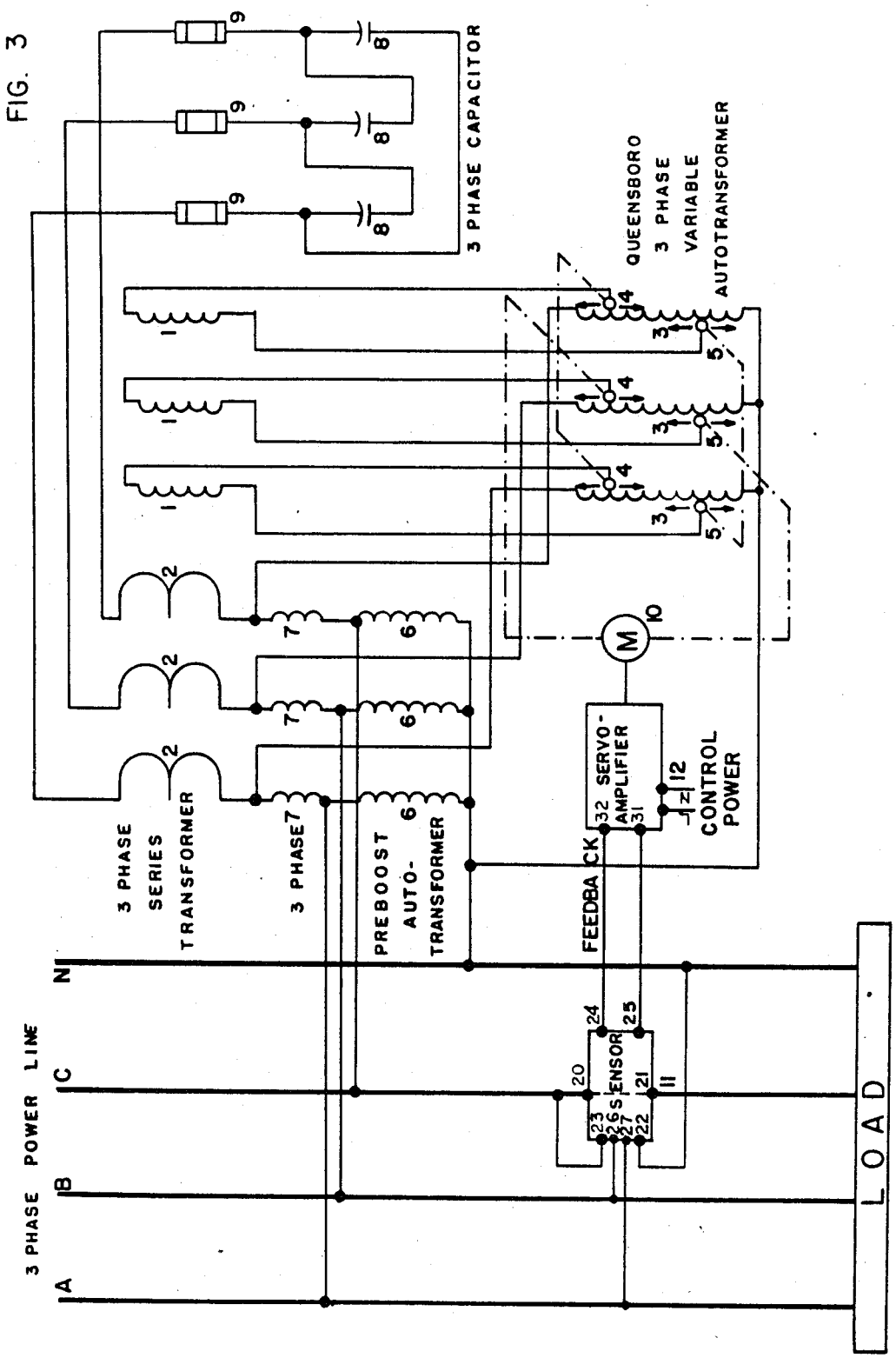
FIG. 3 delineates a schematic similar to FIG. 2 adapted for a three phase system.

This methodology refers to FIG. 3 of the drawing. The principle of the method of control is the same as in A1, but the control embodies the 3 phases of the 3-phase system.

In this methodology the (mostly lagging) reactive power contained in the load circuit (FIG. 3, current terminals 21-22 of 1 phase only, voltage terminals 23, 26, 27, 22) is utilized as feedback signal for the servoamplifier 12, which at its output controls the positioning of servomotor 10, which positions the current collectors of the 3 phases of the variable transformer 7, and determines the compensable reactive power of the 3-phase system. This system is to be used where the phase loads are basically balanced, as for instance in 3 phase single- or a plurality of induction motors, or synchronous motors. Where the currents are not balanced, the sensor should have in lieu of one current circuit (terminals 20-21 of FIG. 3) three current circuits. The output of the sensor will convey to the servoamplifier the three phase reactive power, which will be utilized as the feedback signal for the servoamplifier 12, which at its output controls the positioning of servomotor 10, which positions the 3-phase current collectors of the 3 phase variable transformer 7 to generate a three phase shunt average compensating 3 phase (leading) reactive power.

This system is good as long as the load is composed of 3-phase loads, even not entirely balanced 3 phase loads.

Methodology A3

There are industrial plants, however, whose entire load consists of separate, independent, low-powerfactor, high inductive individual loads. Such a case are Seam Welding (resistance welding) plants, consisting of individual resistance welding loads, in which each individual single phase load has a power factor as low as 0.4 to 0.6, and in which each individual single phase load represents a problem regarding the utility penalty charge, the voltage drop, the watt loss, the absorption of the available operative power. It is obvious that real correction, meaningful energy savings plus a substantial increase in the available operating power are available when phase after phase have individually compensated their individual lagging reactive power.

In the methodology of this invention, each phase is individually corrected as per Methodology A1. Since high voltage in the order of 15 kV is mostly being used to feed such equipment, 3 separate systems per FIG. 7 form part of this invention. The reactive power contained in the load circuit of each individual phase is picked up for each phase individually by the system of FIG. 8, namely by an individual sensor 11, and is utilized as the feedback signal for an individual phase servoamplifier 12, which at its output controls the positioning of the individual single phase variable transformer, wherein the system of this invention has three. The system requires not only, as mentioned, 3 individual single phase QUEENSBORO variable transformers, but also three individual single phase series transformers 1-2, and 3 compensating capacitors 8.

Methodology A3a

For a 3 phase system with loads totally out of balance, this invention provides one more, less expensive system than Methodology A3, though it is less perfect.

For a 3 phase system with loads totally out of balance, or even worse, a 3 phase system combined of 3 independent widely varying single phase loads, the present invention provides another alternate system, which is less expensive than the system described in Methology A3. This less expensive system is shown in FIG. 14, and has already been disclosed in my earlier application Ser. No. 579,119, filed on 02/10/84, referenced in the present application, but since abandoned in favor of continuation-in-part application Ser. No. 06/784,162, filed on 10/02/85.

This methodoloy uses a 2-winding, 3-phase intermediate transformer 60, having its primary winding fed from the line, and having its secondary winding feeding the compensating 3 phase capacitor 8 via a 2 winding series transformer 62, similar to the 2 winding series transformer 2-1, shown in FIG. 3. The intermediate transformer 60, as shown in FIG. 14, is delta-connected on the primary. It will be understood that in a non-illustrated version in lieu of the primary delta-connected intermediate transformer 60 it is also possible to use a primary wye-connected transformer. The secondary winding of the intermediate transformer 60 is isolated from the primary winding, and is zig-zag connected, and zig-zag magnetically coupled. The zig-zag system equalizes the induced line voltage per phase.

The line voltages, as already mentioned, may in such an unbalanced network, be very much apart both in magnitude, as well as in the phase angle, and moreover, may be constantly changing. As in all other systems hereinbefore described, the primary winding of the series transformer 62 is fed from a variable transformer 64, and has its secondary winding connected per phase with one terminal thereof to to the output of the secondary zig-zag connected winding of the intermediate transformer 60, the other terminal thereof being connected to the compensating 3 phase capacitor 8. The variable transformer 64 shown in FIG. 14 is fed from the lines. It will be understood that instead of being fed from the lines, it may be fed from the output of the secondary winding of the zig-zag connected secondary winding of of the intermediate transformer 60, which connection may be advantageous where a high voltage line is used in conjunction with a low voltage control system. In general the aforedescribed system is suitable for lines ABCN being high voltage, and alternately also for the lines ABCN being low voltage, The control follows the methodology of FIG. 8A, adapted for 3 phases.

The control follows methodology A2.

Methodology B1

The methodology refers to the same power circuit diagrams as before, the control diagrams being FIG. 10–FIG. 11, and in circuit continuation FIG. 12, and alternatively FIG. 13.

With non-sinusoidal power sources, and/or with non-linear loads, unity power factor no longer results in optimization of the power consumption, power demand and power availability.

Therefore in non-sinusoidal power sources and/or with non-linear loads, instead of aiming for unity power factor, a system should aim for:

Minimization of upstream watt losses,
Minimization of power demand consumption, and
Maximization of power availability.

Referring now to FIG. 1 of the drawing, the latter shows the simplified arrangement of a single phase system. An incoming power line is shown, L being the line terminal. N being the neutral; the system feeds a load which is assumed to be partially inductive, requiring leading reactive power compensation. This reactive power compensation is achieved by a shunt circuitry, comprising a fixed-ratio series transformer 1, 2 and a variable transformer 3. The secondary 2 of the fixed-ratio series transformer is connected in series with the power line L; its primary 1 is fed through the current collectors 4 and 5 of the variable transformer 3. The variable transformer 3 is a product of the Queensboro Transformer & Machinery Corp; it is of the column type and preferably has its current collectors 4 and 5 constituted by carbon rollers which glide on the windings of the variable transformer coil columns. These carbon roller current collectors 4 and 5 in the Queensboro Transformer are driven from a capacitor gear motor 10 via bevel gears and lead screws in such a way that when the current collector 4 rides in the direction up, the current collector 5 will ride at the same pace, and speed in the opposite direction. The current collectors 4 and 5 are mutually displaced 180° on the circumference of the coil surface, so that if the collector 4 glides on the front of the coil, the collector 5 will glide in the opposite direction on the rear of the coil. The variable transformer 3 coil is energized at its fixed end terminals from the line voltage from lines L-N. When the position of the current collector 4 coincides with the position of current collector 5, both draw current from the same turn of the variable transformer 3, and the resulting voltage across collectors 4 and 5 becomes zero. When the position of the collector 4 has reached one end of the coil, say, the top, and subsequently the collector 5 has reached the bottom, the voltage at collectors 4 and 5 becomes equal to the line voltage and the line voltage is fed into the primary of series transformer 1. This votage will induce a certain voltage in the secondary 2 of the series transformer, and the magnitude of this voltage will depend on the primary to secondary turns ratio. If this turn ratio is 1:1, the voltage produced by the line plus that of the primary 1 of the series transformer becomes double the line voltage. By the same reasoning, when the contacts 4 and 5 coincide, i.e. when they have met on the lateral centerline of the coil column, the line voltage plus the secondary voltage of the series transformer becomes equal to the line voltage. For any position of the contact 4 between the lateral, zero centerline and its uppermost position, the voltage which is applied to a capacitor 8 varies between the magnitude of the line voltage and the highest voltage available from the series transformer secondary 2. The voltage can be changed at will e.g. manually, by pushbuttons or by automatic control in infinitely small variations and brought extremely accurately to a magnitude needed.

When the collector 4 reaches the other extreme, lowermost position in which case the collector 5 reaches its uppermost position, once again the magnitude of the voltage available on collectors 4 and 5 is the line voltage. But as it may be seen from FIG. 1, its polarity is reversed. This reversed polarity reverses the direction of the magnetic flux in the series transformer 1, 2, in consequence of which the voltage induced in the secondary 2 of the series transformer 1, 2 will no longer add, but subtract from the line voltage. In the case of a series transformer winding ratio of 1:1, when collector 5 reaches the top, the voltage applied to the capacitor 8 becomes zero, and according to the position of the carbon roller current collectors 4, 5, the total voltage ranges from zero to double line voltage can be achieved, and achieved in infinite increments.

Capacitor feeding range extending from a certain maximum down to zero is feasible with the device of this invention. Extending said range down to zero, which means extending the range of the compensating leading reactive power down to zero is the only possibility achievable in the prior art, but this invention also provides a practical possibility of having the lower limit to be greater than zero, and by doing so, having the advantage of reducing the size, and subsequently the cost of the device. Zero voltage applied to the capacitor, which is the same as zero leading reactive power, is never necessary, and extending this reasoning it might be said that less than 40% of the maximum required corrective leading reactive power is seldom necessary in practical power line power factor improvement tasks. The ability to shift the corrective lagging reactive power range's bottom border resulting in reduction of the size of device is one of the economic advantages of this invention. The numeriocal example presented hereunder will illustrate it:

We assume, we have a 200 kVA, 1 phase, 60 Hz, 240 V, power line, requiring a maximum reactive power correction of 100 kVAR. We are looking for the most favorable solution. Let us first analyze the use of the prior art, assuming we utilize 9 capacitors of 11.1 kVAR, 240 V each, achieving by switching the following reactances: 99.9/88.8/77.7/66.6/55.5/44.4/33.3/22.2/11.1/0.0 kVAR, of which the last 3 to 4 steps are unnecessary, but if eliminated, the device becomes more expensive, because of the higher current rated switches required; less practical, because elements would no longer be interchangeable.

As the second comparative example, we take the above described voltage variation system, having a 1:1 primary to secondary winding series transformer ratio, using a single capacitor 100 kVAR, 480 V, costing approximately $\frac{1}{4}$ of a 100 kVAR, 240 V single capacitor and even less, when compared to 9 subdivided capacitors. The voltage range applied to said 100 kVAR capacitor is 480 V to zero. One half of this power is supplied directly from the lines, the other half, i.e. 50 kVA is supplied by the series transformer 1, 2 whose rated capacity therefore becomes 50 kVA, and likewise the variable transformer 3 which has to feed winding one of the series transformer, must also be rated 50 kVA.

Let us now show a third comparative example, in which the bottom range portion is deleted. We assume now a series transformer, whose primary 1 to secondary 2 winding ratio is 1:0.5. The highest voltage induced in winding 2 will be 120 V; consequently the lowest voltage applied to the capacitor becomes 240−120=120 V, the highest voltage 240+120=360 V. The capacity of the series transformer becomes 33.3 kVA, which represents $\frac{1}{3}$ saving in capacity, $\frac{1}{4}$ saving in the cost of both the series transformer as well as of the variable transformer. However, in this example we must use a 360 V capacitor, which for the same 100 kVAR size is more expensive than the 480 V capacitor of example 2. The diagram FIG. 2 which will be described later, has the purpose of offsetting this disadvantage.

The capacitor 8 disposed in parallel with the load in FIG. 1 has to withstand the highest voltage the system can produce. As it is known, the higher the rated voltage of a capacitor, the lower its capcity in microfarads for a given kVA rating, and consequently the lower its price. This is one of the economic advantages of this invention: capacitors for higher rated voltages are applicable here. The next economic advantage compared to the switching technique used in the prior art is that a single full size capacitor can be used; there is no need to subdivide it into a number of capacitors of smaller sizes.

A single larger capacitor is more economic in cost and in size and in the expense of mounting and wiring. The capacitor 8 is shown on schematic diagrams FIGS. 1, 2, 3, as protected by fuse 9. This fuse has been inserted to show that in general, the conventional practice can be followed, and a fuse embodied in the system. Yet it is unnecessary, because with the absence of abrubt leading reactive CURRENT changes, chances of blowing of such a fuse are nil.

Figure 2:
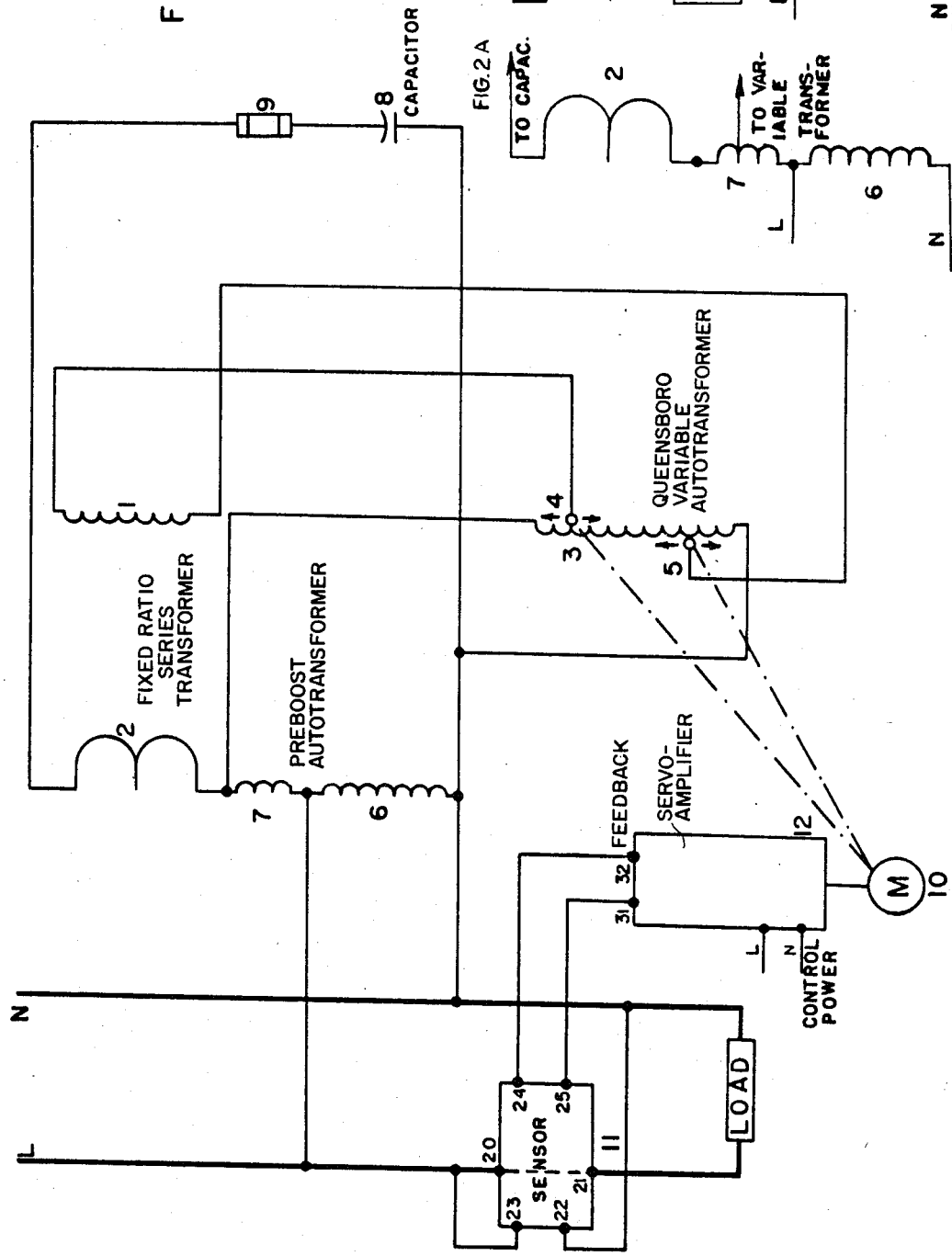
FIG. 2 details a schematic similar to FIG. 1 which includes a pre-boost auto transformer which permits adaptation of the system to a substantially higher capacitor voltage rating plus reducing of the unnecessary bottom portion of the reactive power correction range, both of these measures having the purposes of cost reduction.

A simplified diagram of the automatic control is illustrated in FIGS. 1, 2 and 3; a diagram in greater detail, but still simplified is illustrated in FIG. 8 in more detail, but in a didactic manner. In FIG. 1 the motor 10 drives the carbon roller current collectors 4 and 5, to wit: the collector 4 up and the collector 5 down when it rotates clockwise, the collector 5 up and the collector 4 down on counterclockwise rotation. The motor 10 has clockwise (raise) and counterclockwise (lower) motion windings, shown in FIG. 8. A reactive power sensor 11 as shown, has in single phase devices 2 current terminals 20, 21, which are illustrated as inserted in the L power line. It has 2 potential terminals, one connected to power line L (23), one to the neutral N (22). Instrument transformers have been omitted for the sake of simplicity and clear understanding, though in practice the use of current sensing via a current transformer is unavoidable, and in many cases a potential transformer is necessary. The signal generated by the sensor 11 which appears on terminals 24, 25, is picked up by servoamplifier terminals 31, 32. On FIG. 8 it is shown that the servoamplifier 12 has a reference signal circuit, fed from the control lines L, N, and in the usual way this reference signal circuit comprises zener diodes, and on its output it includes a potentiometer setpoint adjustment. The feedback from the reactive power sensor 11 which enters the servoamplifier 12 with terminals 31, 32, passes, as shown in FIG. 8, through a feedback signal processing circuit. The two signals, reference and feedback are then compared, again as shown on FIG. 8, in an operational amplifier which produces a positive, or a negative error signal. It may be seen on FIG. 8 that thereafter the error signal passes through a signal process and amplification circuit. The processed and amplified signal, as shown on FIG. 8, energizes either relay coil L (lower) or coil R (raise). When coil L is energized, the pertaining normally open contact L closes, which causes current to flow from control line L via a normally closed limit switch L to the "Lower" winding of Motor 10, which will cause a counterclockwise motion of the motor 10. The motion of the motor will make, as illustrated on FIG. 1, current collector 4 travel down, current collector 5 travel up which will cause lowering the voltage applied to capacitor 9. The motion will stop when the reactive power compensation has reached its preset value, at which time moment the magnitude of the error will become close to zero, as close to zero, as the rated accuracy of the regulator amounts to. When the error becomes zero, coil L becomes de-energized, its pertaining contact L opens, the feeding line to the "Lower" winding of the motor is interrupted, the motor stops, the travel of the current collector stops, the process of voltage change stops, the process of correction of the reactive power stops, and subsequently the process of power factor correction is so far, completed. All these motions stop also when the current collectors hit their mechanical limit position thereby engaging the normally closed limit switch L, as also shown in FIG. 8.

The control circuitry of FIGS. 1, 2, 3 and 8 serves as a basis for the detailed and novel control circuitry described hereinbelow and illustrated in FIG. 8a.

Figure 8A:
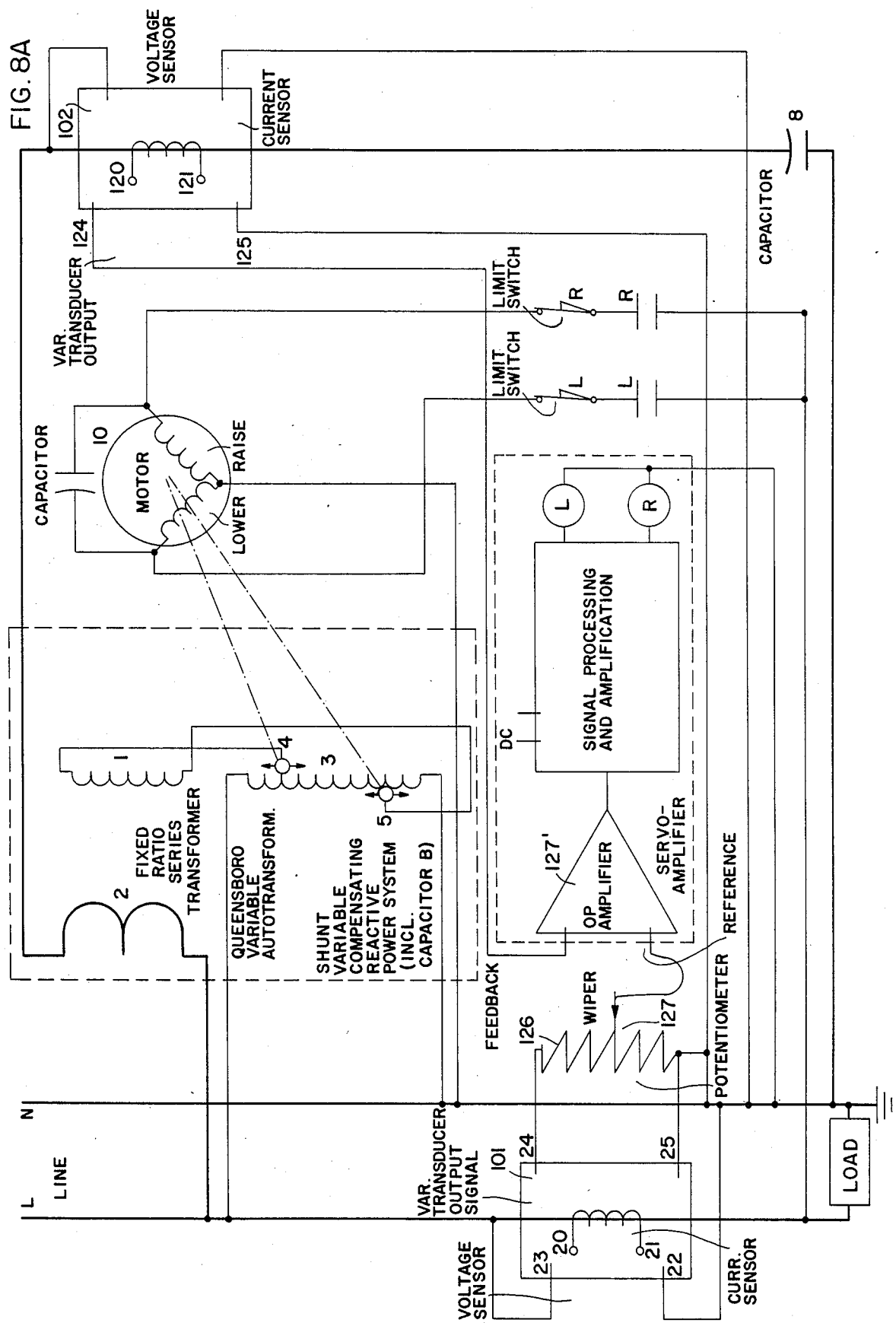
FIG. 8a is an alternate control system utilizing feedback in conjunction with manually settable control means.
Figure 9B:
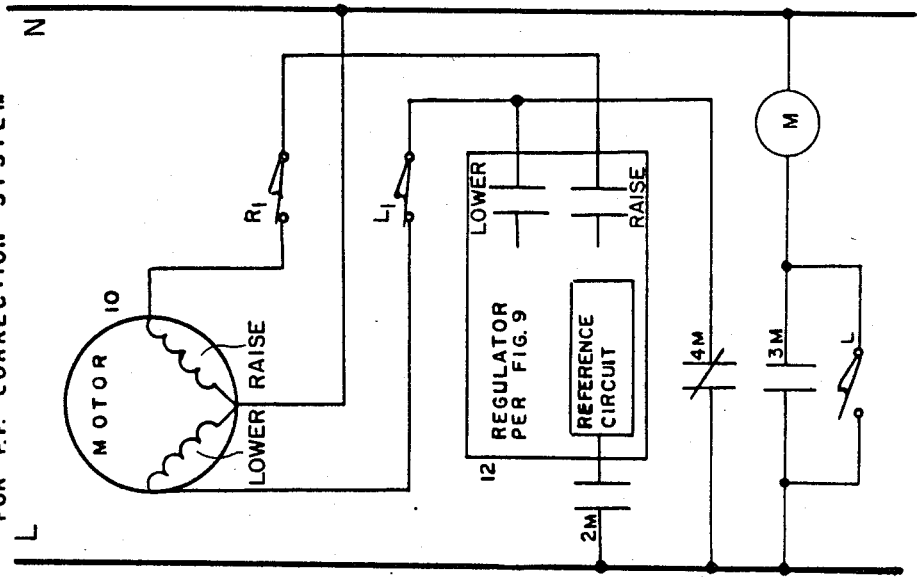
FIGS. 9A and 9B shows the way in which the device per FIGS. 1, 2, 4, 5, 6, or 7 resets itself to the position of the lowest capacitor feeding voltage at the time power is interrupted, in order to start with the lowest available voltage, for which there has been applied a patent application serial number 06/271,202, mentioned supra, now U.S. Pat. No. 4,438,387, with which the present device safety is enhanced.
Figure 9A:
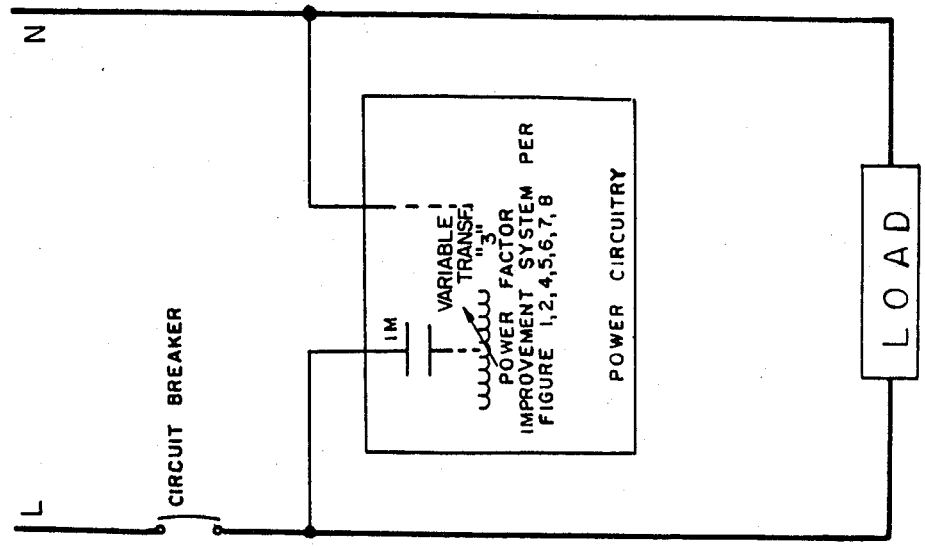

The system shown in FIG. 8a uses two commercially available VAR transducers 101 and 102, which are not necessarily of the same type. VAR transducer 101 is inserted in the load circuit, and senses the magnitude of the load reactive power, and whether it is leading or lagging. VAR transducer 102 is inserted in the shunt compensating reative power portion of the system, and senses correspondingly the magnitude of the compensating reactive power, and also whether it is leading or lagging with respect to to the line feeding voltage. The VAR transducers are commercially available transducers, for example Square D CLE-2050000. Each VAR transducer 101 and 102 is provided with a voltage sensor, which terminates in a potential transformer; for the sake of clarity, only the voltage sensing leads and their connection are shown in FIG. 8a. Each VAR transducer 101 and 102 is also provided with a current sensor, each being shown as a coil terminating in terminals 20, 21, and 120, 121, respectively, and also have output terminals 24, 25 and 124, 125, respectively. The VAR transducer 101 of the load circuit is shunted by a potentiometer 126, which permits to gradually reduce a reference signal provided. The full reference signal is indicative of the total reactive power consumed by the load. The wiper 127 of the potentiometer 126 is connected to one of two inputs of an operational amplifier 127. The system shown in FIG. 8a only has been so arranged that if the potentiometer wiper 127 is fully extended, the corrected power factor will become equal to unity. The further the wiper 27 is removed from its "full output" position, the lower will become the regulated power factor.

The second VAR transducer 102 is shown on the right upper side of FIG. 8a, and is inserted in the variable compensating reactive power circuit. Terminal 125 is grounded, while a feedback signal is provided on terminal 124. The feedback signal is compared to the reference signal in operational amplifier 127, and produces a positive or negative signal. The novel features of the present implementation are that no zener diode or equivalent thereof is provided. It should be noted that a zener diode regulator, although operating properly so as to achieve a constant voltage, or constant current, or constant reactive power, cannot be made accurate, to provide variable reactive compensation, or a variable power factor correction.

The system, according to the present invention, extracts the existing VAR power content of the load directly, and compares it directly with the VAR content of the shunt compensating system, a method never before suggested or implemented, and especially adapted for the novel reactive, continuously variable power shunt system, according to the present invention.

The system's accuracy does not depend on the waveform, or frequency, unlike a control system using power factor sensors, which cannot, as is known, be made frequency-insensitive. But the result can be measured and recorded by a power factor meter.

FIG. 8a shows a single phase system, using a single element VAR commercial transducer in the load circuit, in addition to a single element VAR commercial transducer in the circuit of the shunt compensating reactance circuit.

In polyphase systems the solutions are analogous, and are implemented according to the individual problem.

Thus in 3 phase, 3 wire (delta connected) loads the VAR transducer for the load is preferably a commercial 2-element transducer (e.g. Square D CLE205002), and once again the same holds for the shunt reactive circuit. In 3 phase, 4 wire (wye connected) loads, the system is connected as shown in FIG. 3 with regard to power, the load VAR transducer is advantageously a 3 element VAR transducer e.g. Square D CLE-205004), while for the shunt reactive system the 2 element transducer suffices, even for unbalanced loads.

For loads entirely composed of single phase uneven loads, 3 single phase power systems with 3 single element transducers per load and per shunt-compensating reactive circuitry, respectively, are used, in accordance with the instant invention.

When the error is negative, coil R will be energized, contact R closes, current flows from Line L via the normally closed limit switch R to the "Raise" winding of motor 10, whose motion will make current collector 4 travel up, current collector 5 travel down, causing gradual raising of the voltage applied to capacitor 9, causing gradual increase of compensating leading reactive power. The motion will stop when again the magnitude of the error reaches zero within the rated accuracy of the regulator. The motion will also stop when the current collectors reach their mechanical extreme position, thereby engaging limit switch R.

The regulation of the reactive power is then electrically translated to a thereto closely related power factor regulation. In lieu of electromechanical relays, solid state relays can be used. As a refinement, the "raise" and the "lower" relays will be cross-interlocked utilizing auxiliary contacts, to make the control circuitry failsafe. A further refinement is an addition of a P-I-D (proportional/integral/derivative) module within the signal Processing and Amplification section.

In lieu of the mentioned error detection system a microprocessor can be used. A microprocessor would be sampling the reactive lagging power plus the reactive leading power and use three point control by disabling the seek operation until a leading lagging ratio change is sensed. Also a microcomputer can be used for the control.

Whichever method is used, extreme accuracy of compensation is achieved, to which the prior art of capacitor switching can never compare. As mentioned, the per kVA capacitor cost is very much lower if the rated voltage is increased. FIG. 2 shows an adaptation of the method shown in FIG. 1 for the use of capacitor voltage ratings substantially higher than the line voltage available. In a general type of application, the diagram of FIG. 2 is more likely the one to be used, because of the easy adaptation of an adequately high voltage applied to the capacitor and just as importantly, because of the design-wise easy rescission of any unwanted bottom range portion of the reactive power compensatory bandwidth. In FIG. 2 a pre-boost autotransformer 6, 7 is added to the circuitry of FIG. 1, with 6 designating the root winding, i.e. the primary, 7 designating the boost winding, making 6+7 the secondary. The highest voltage, which must be made equal to the rated capacitor voltage and which gives the highest leading reactive power is equal to the voltage:

$$\text{Voltage 7 to neutral} + \frac{\text{Voltage 7 to neutral}}{\text{Turn ratio winding 1:winding 2}}$$

The lowest voltage obtainable with this appartus which produces the lowest available leading reactive power is equal to:

$$\text{Voltage 7 to neutral} - \frac{\text{Voltage 7 to nuetral}}{\text{Turn ratio winding 1:winding 2}}$$

The highest voltage can be selected as high as 5 times the rated line voltage for example, if dielectric considerations and Electrical Code restrictions permit same.

On FIGS. 1 and 2, instead of having the load plus the compensating circuitry fed from the power line L and the neutral N, they can be fed from line-to-line.

On FIG. 2 the variable transformer 3 is fed by a potential at which the autotransformer boost winding 7 is connected to the series transformer 22. This is not absolutely necessary. FIG. 2A shows a variation in which the variable transformer 3 is fed from a tap of the autotransformer boost winding 7, i.e. from a potential lower than in FIG. 2. The lowest practical potential is the point in which the autotransformer root winding 6 is connected to the boost winding 7. FIG. 2B illustrates a variation in which the variable transformer 3 is fed from a potential higher than the one shown on FIG. 2.

FIG. 3 shows the same system as FIG. 2, but adapted to a 3 phase, 4 wire power line. All transformers illustrated should preferably be of the 3 phase, cor. type. Otherwise the function is the same as described for FIG. 2.

The servoamplifier 12 is the same as in FIGS. 1 and 2. The sensor 11 is shown on FIG. 2 in a presentation valid only for a 4 wire, balanced phase system, and requires a description for other systems. The sensor 11 shown on FIG. 3 has a single current path shown by the interrupted line between current terminals 20, 21, inserted in phase C. It shows 3 potential paths, one being 27 to 21-phase A to neutral, the second 26 to 21-phase B to neutral, the third 22 to 21-phase C to neutral. In a 3 phase, 4 wire unbalanced load system the same 3 voltage paths are needed, but also 3 current paths, which means all 3 phases A, B, C are interrupted in the way shown for phase C. In a 3 phase, 3 wire balanced load system, there is one current path; referred to FIG. 3 it would be in phase C, terminals 20, 21. There will be one only voltage path, between phases A and B only, i.e. between terminals 26 and 27. Terminals 22 and 23 would be omitted. This particular circuitry, being the simplest, is more easily understood, and, for illustration can be used in lieu of the system shown on FIG. 3.

On FIGS. 1, 2 and 3 the reversible polarity variable voltage is obtained from the Queensboro Column Type Variable Transformers which are an advanced technical development electrically, magnetically and mechanically. They can be made for any kVA rating to thousands of kVA; they provide infinite resolution, sparkless commutation, they have magnetically balanced fields obtained by equilibrating windings, they have well engineered mechanical movements on ball bearings good for years of unattended service. However, substitute solutions are possible.

ALTERNATE EMBODIMENTS

In FIGS. 1, 2 and 3, which represent preferred embodiments, the Queensboro Column type reciprocal motion variable autotransformer has been used. As described, it is a high-technology machine, offering almost perfect performance, it is suitable for unattended service, and has no size limitation. A question may arise whether the commonly available toroidal variable transformers, a (variac, powerstat), a cheap, limited size device (at present technology), device can be utilized. The answer is affirmative, if there is awareness of the shortcomings in reliability and in the need for very substantial kVA capacity derating, when paralleled.

Figure 4:
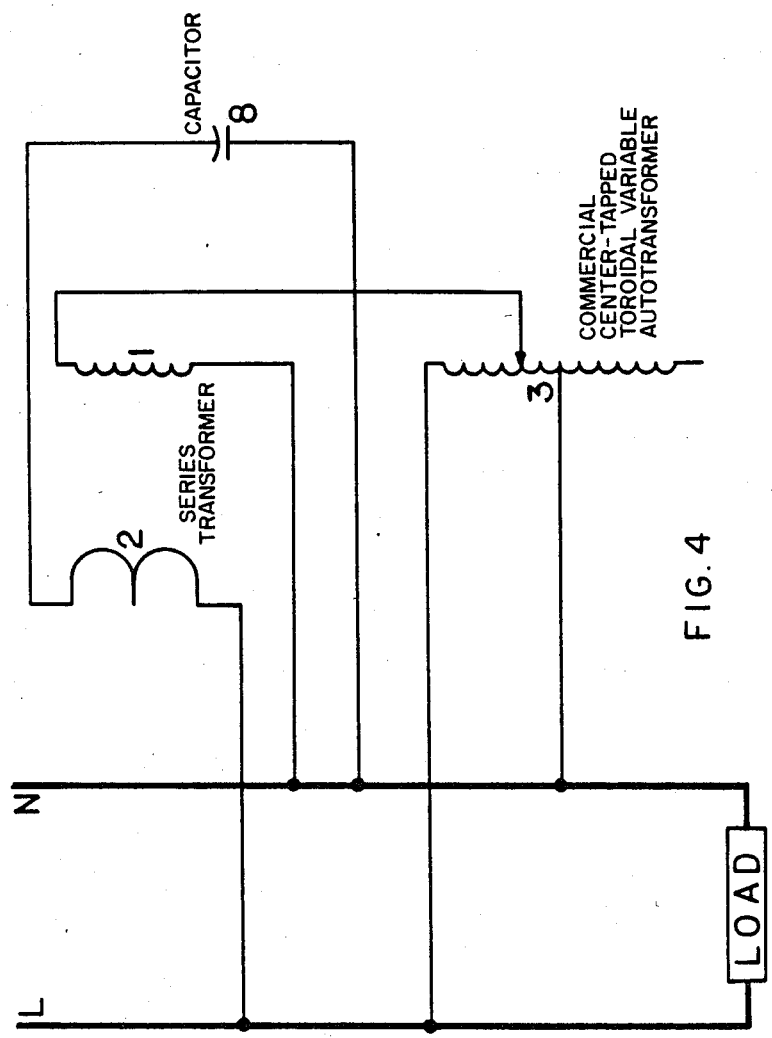
FIG. 4 delineates an alternative power circuit solution to that which is shown in FIG. 1 including a center tapped toroidal variable transformer, to demonstrate that for limited power ranges the idea of this invention can be adapted also to the use of readily available commercial power components.

FIG. 4 shows a solution utilizing a center-tapped toroidal autotransformer, the function is self-explanatory.

Figure 5:
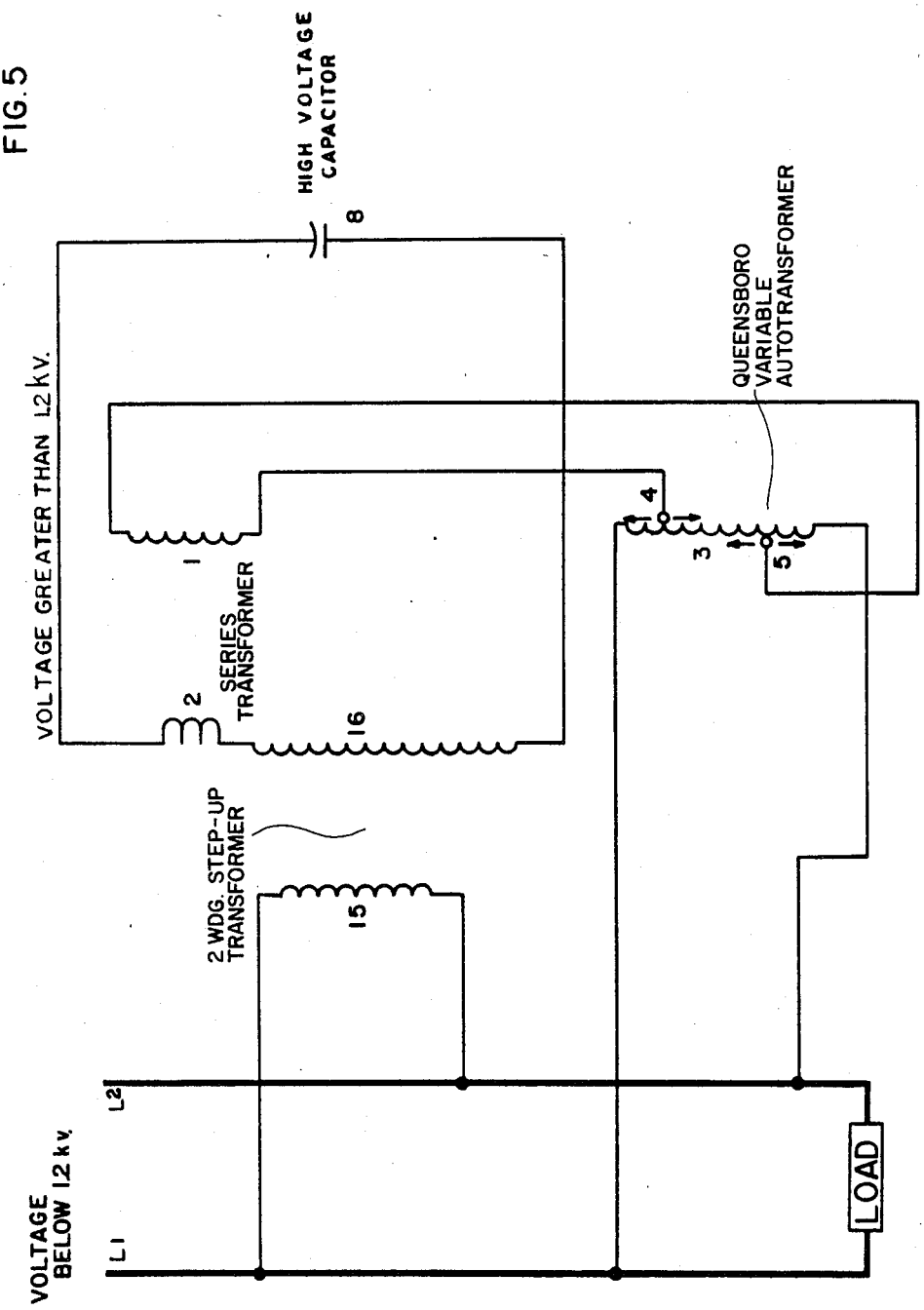
FIG. 5 teaches how to proceed when the power lines belong to the ANSI low voltage class, i.e. below 1.2 kV, yet the power capacity is so very large that it becomes economic to use a capacitor having its voltage rated higher than the 1.2 kV ANSI class.

FIG. 5 shows a solution to the problem where the power line voltage remains within the category of low voltage i.e. below 1.2 kV, whereas for reason of cost it is intended to use a compensating capacitor rated at a high voltage, e.g. 15 kV. The system is, as shown, similar to the system represented by FIG. 1, except that a two winding transformer has been inserted, the primary being the low voltage winding 15 and the secondary the high voltage winding 16. The circuit of the high voltage winding 16 is adequately insulated from the primary winding circuit. The only disadvantage of the system FIG. 5 compared to the other systems is the added cost of the 2-winding transformer, which is more expensive than an autotransformer. This extra cost is, however, totally or at least partially compensated for by the lower cost of the capacitor for a still higher voltage than FIG. 2 for example will permit.

FIG. 6 represents a case where the power line voltage is a high voltage, say 15 kV class or below. The solution shown is the use of a two-winding variable transformer, with the primary 17 being a high voltage fixed winding, and the secondary 3 being a low voltage variable ratio winding.

FIG. 7 shows a solution with a two-winding fixed-ratio transformer, with the primary 18, and the secondary 19 feeding a low voltage variable transformer. The system shown in FIG. 8 can be applied to line voltages higher than with the diagram represented by FIG. 6. The control system for FIG. 4 to FIG. 7, basically remains the same as for FIGS. 1, 2 and 3.

In the preceding discussion, it has been tacitly assumed that the apparatus described operates at the fundamental frequency of the generator supplying the power lines. Under those conditions a power factor control system with stepless control, or as described in my copending application Ser. No. 480,496 can be set to maintain a constant power factor of 1.00 within an accuracy of 0.25%. Achievement of a power factor 1.00 is meaningful, however, only with sinusoidal voltages i.e. voltages, deviating from a sine wave in their harmonic content by no more than 2% in terms of the wave amplitude.

In present day networks, loads are in many cases non-linear due to the use of forced commutation rectifiers, of thyristor rectifiers, of uninterruptable power supplies, and other non-linear circuits. Moreover, under today's actual conditions, power supplied by transmission lines at the point of load application is frequently non-sinusoidal. Under those changed conditions one deals, in addition to the fundamental, with harmonics of the fundamental power frequency. Here the objective is no longer a unity power factor, but a goal has to be set for non-linear loads and non-sinusoidal voltages supplied to the load. In order to set such a goal, it is well to remember that in present day networks, the voltages supplied are rarely sinusoidal. Achievement of sinusiodal voltages has been possible up to the period in time when loads have changed from predominantly linear loads to largely non-linear loads, due to the use of forced commutation, thyristor rectifiers, uninterruptable power supplies (UPS), and other non-linear loads. Moreover, under today's actual conditions, power is mostly supplied by transmission lines whose voltage at the point of load application is almost always non-sinusoidal. Under those conditions one deals not with a single frequency, but with a multiplicity of frequencies, namely harmonics of the fundamental power frequency. One of the objects of reactive power compensation is to minimize the transmission line energy losses. Another object of the reactive power compensation system is to minimize the demand, and to maximize the available useful power. Both are achieved, according to the present invention by setting the ratio of the derivative of the square of the current ($I^2$) flowing in the power supplying line to the derivative of the compensating wattless power (VAR) equal to zero. In mathematical terms $$dI^2/dVAR=0.$$

where I is the total current flowing in the transmission line to the load plus the current flowing to the inventive power correction system. The square of this current is proportional to the actual watt loss in the power supplying line. VAR is the wattless power to be compensated by the inventive power correction system. Thus the present invention sets new criteria for minimizing power transmission losses for non-linear loads, or for non-sinusoidal voltages delivered by power lines, as a substitute for achieving a unity power factor for linear loads, on for power supplies supplying sinusoidal voltages.

But setting $$dI^2/dVAR=0$$

is equivalent to setting $$(dI^2/dt)/(dVAR/dt)=0,$$

and this is the preferred implementation described below with the aid of FIGS. 10 and 11. FIG. 10 is a modification of the basic circuit of one phase of a 3 phase system described in my copending application Ser. No. 480,496. Here a current transformer 30 is inserted into the power line L. The secondary of the current transformer 30 feeds a commercially available A.C. current transducer, delivering a signal proportional to the current in line L to an A/D converter 34A shown in FIG. 12.

In FIG. 10 is also shown the Queensboro Variable Autotransformer 3 feeding the primary of the fixed ratio series transformer 1, with the secondary 2 of the series transformer being in series with the line L N, and feeding the compensating capacitor 8, which has already been illustrated in FIG. 1. In the circuit feeding the capacitor 8 is inserted the current path of a VAR transducer 32, whose voltage path is connected across the terminals of the capacitor 8. In practice the current path is inserted through the intermediary of another (non-illustrated) current transformer, which has been omitted for the sake of clarity.

The output of the VAR transducer 32 delivers a signal proportional to the VAR (compensated by the circuitry including the capacitor 8) to the A/D converter 34, as shown on FIG. 12.

In FIG. 12. the analog to-digital (A/D) converter supplied by a current transducer 31 coupled to the line LN feeds a commercially available logic squaring circuit 35, whose rectified output signal is proportional to the square of the current ($I^2$). The rate of change of $I^2$ is relatively slow compared to the power frequency, for example 2 cycles per second. A clock 38 samples $I^2$ at a rate sufficient to detect any changes in its average value, for example at the rate of 10 samples per second. Both a gate 36, accepting the $I^2$ signal, and a gate 37, accepting the VAR transducer signal, are sampled by the clock 38. The output of the gate 36, constituting the $I^2$ signal sampled at the rate of the clock 38, is fed (a) to one input of a subtractor 45 directly, and (b) fed to another input of the subtractor 45 through a delay circuitry, constituted by a digital-to-analog (D/A) converter 39, an analog delay 41, and an A/D converter 43. The total delay of the aforedescribed delay circuit is equal to 1/f, where f is the sampling frequency of the clock 38. Thus the subtractor 45 will have at its output a signal proportional to $dI^2/dt$.

Similarly, an analog-to-digital (A/D) converter 34B, supplied from a VAR transducer, feeds a gate 37 feeds one input of a subtractor 46 directly, while another input of the subtractor 46 is fed through a delay circuit constituted by components 40, 42, and 44, which are in every respect similar to components 39, 41 and 43. Thus at the output of the subtractor 46 there will appear a signal proportional to $dVAR/dt$. The output of the subtractor 45 is fed to one input of a commercially available logic divider 47, while the other input of the logic divider 47 accepts the output of the subtractor 46, in such a manner that at the output of the logic divider 47 there will appear a digitized signal proportional to $dI^2/dVAR$. That digitized signal is converted into an analog signal by a D/A converter 49. The output of the D/A converter 49 is fed to rectifiers 50 and 51 through (non-illustrated) isolating circuitry. The output of rectifier 50 is a "negative only" signal. These outputs are fed, in turn to a "lower" relay coil 52, denoted also as L, and to a "raise" relay coil 53, denoted also as R.

FIG. 11, which constitutes another representation of FIG. 8a, shows the circuit of the motor 10 actuating the current collector gear of the variable autotransformer of FIG. 10 (also of FIG. 1), and also shows the above-described relay coils 52 (L) and 53 (R). Relay coil 52 has an N.O. contact 52A through which the lower winding of the motor 10 is energized. Relay coil 53 has a normally open contact 53A, through which the raise winding of the motor 10 is energized.

An additional feature of this invention is the prevention of destructive series resonance between the transmission line and the capacitor, which is a serious menace in the presence of higher harmonices both for the present inventive system, as well as for systems of the prior art.

A transducer relay 48 accepts the $dI^2/dt$ signal from the subtractor 45 as shown in FIG. 12. A normally closed contact 48A of relay 48 inserted in the raise lead of motor 10 will disable the raise function of the motor 10, upon reaching a preset threshold, as shown in FIG. 11.

A second contact of relay 48, the normally open contact 48B also shown in FIG. 11, energizes at the same time in a separate circuit 61 resonance control relay 54. Upon energization of the resonance control relay 54, in a second separate circuit 62 its normally open contact 54A closes, energizing time delay relay 55. After a preset time delay has elapsed, then in a third separate circuit 63 the time delay relay's contact closes, energizing power contactor 56. When relay 48 has detected the threshold of a dangerous incipient crest of $dI^2/dt$, and contact 48A has opened, the danger has disappeared, however, on the power supplying line further power factor correction is stopped, making the so-far achieved degree of correction insufficient. As shown in FIG. 10, the terminals of the current-limiting series reactor 57 are normally shorted by means of a normally closed contact 56A of power contactor 56. Now, at the time the power contactor becomes energized, as hereabove described, reactor 57 changes the reactance of the line and annihilates the resonance. Relays 48, 54, 55 have their coils de-energized, but the time delay relay's contact 54A remains closed, the power contactor 56 remains energized, its contact 56A remains open. Contact 48A remains closed, contacts 48B and 54 remain open. This permits the "raise" motion of motor 10 to resume, and to continue the power factor improvement action until the optimum has been reached.

I claim:

1. A power-factor correction system for reactive power control and concomitant power factor correction adapted to cooperate with a line supplying power at a given line voltage from power generating means to an inductive load via a given path, comprising in combination, reactive power compensating means in shunt with said line supplying power, and adapted to be connected in shunt with said inductive load, and including fixed capacitance means, and voltage applying means delivering a voltage of continuously variable magnitude in a stepless manner to said fixed capacitance means in response to any change in lagging reactive power consumed by said load so as to correct the magnitude of the power factor in said line supplying power to said inductive load to a sensed optimum correction value as a result of said power compensation means generating thereacross a resulting compensating reactive power in proportion to the square of said voltage of variable magnitude delivered to said fixed capacitance means so as to at least partly off-set said lagging reactive power, whereby power factor correction is optimized, yet not producing any transient.

2. The power-factor correction system for reactive power control and concomitant power factor correction as claimed in claim 1, wherein said voltage of variable magnitude delivered by said voltage applying means to said fixed capacitance means is such that said leading reactive power generated by said reactive power compensating means offsets said lagging reactive power substantially completely, so that said sensed optimum correction factor is a power factor of about unity.

3. A power-factor correction system for reactive power control and conmitant power factor correction adapted to cooperate with a line supplying power at a given line voltage from power generating means to a capacitive load via a given path, comprising in combination, reactive power compensating means in shunt with said line supplying power, and adapted to be connected in shunt with said capacitive load, and including fixed inductance means, and voltage applying means delivering a voltage of continuously variable magnitude in a stepless manner to said fixed inductance means in response to any change in lagging reactive power of said load so as to correct the magnitude of the power factor in said line supplying power to said capacitive load to a predetermined correction value as a result of said power compensating means generating thereacross a compensatory reactive power in proportion to the square of said voltage of variable magnitude delivered to said fixed inductance means so as to at least partly oof-set said leading reactive power, whereby power factor correction is optimized, yet not producing any transient.

4. The power-factor correction system for reactive power control and concomitant power factor correction as claimed in claim 3, wherein said voltage of variable magnitude delivered by said voltage applying means to said fixed inductance means is such that said lagging reactive power generated by said reactive power compensating means offsets said leading reactive power substantially completely, so that said sensed optimum correction factor is a power factor of about unity.

5. The power-factor correction system for reactive power control and concomitant power factor correction as claimed in claim 1, wherein said voltage applying means include a series transformer, having isolated primary and secondary windings, said secondary winding being connected in series with the given line voltage from said power supplying line so as to provide a feeding voltage to said fixed capacitive means, and a variable transformer fed from said power supply line and feeding said primary winding of said series transformer with a first variable voltage, so as to, in turn, induce in said secondary winding a second variable voltage in phase with said power supplying line, whereby a corrective power having a magnitude proportional to the square of the algebraic sum of the given line voltage and of said second in-phase variable voltage is applied to said fixed capacitive means, and whereby a lagging reactive power in said power supplying line is off-set by any leading reactive power produced by the resulting compensating reactive power.

6. The power-factor correction system for reactive power control and concomitant power factor correction as claimed in claim 5, wherein said voltage applying means comprises closed loop regulation means, said closed loop regulation means including first sensing means for sensing said reactive power consumed by said load, and for generating a reference signal indicative of said reactive power, second sensing means for sensing the resulting compensating reactive power, and for generating a feedback signal indicative of said resulting compensating reactive power, said reference and feedback signals having respective magnitudes, and comparator means accepting the reference and feedback signals, comparing the feedback signal to the reference signal, and providing an output in dependence of said sensing signal and of said reference signal so as to produce an error detection signal of a definite magnitude having a positive or negative sign, said variable transformer having control means accepting the output of said comparator means, thereby controlling the first variable voltage of said variable transformer.

7. The power-factor correction system for reactive power control and concomitant power factor correction as claimed in claim 6, further comprising reference signal setting means for manually setting the magnitude of said reference signal accepted by said comparator means to be indicative of a fraction of said reactive power.

8. The power-factor correction system for reactive power control and concomitant power factor correction as claimed in claim 5, wherein said variable transformer includes
   at least one coil column,
   two rolling current collectors gliding continuously on said coil column, one current collector traveling at a predetermined speed in one direction, the other set traveling in a direction opposite to said one direction at a speed equal to said predetermined speed, said directions being reversible so that an essentially infinite variation of the magnitude, and a reversal of polarity of said first variable voltage, respectively, are obtained.

9. The power-factor correction system for reactive power control and concomitant power factor correction as claimed in claim 8 for use in connection with a single-phase power system, wherein each coil column has an even number of current collectors, each half thereof travelling in respective opposite directions.

10. The power-factor correction system for reactive power control and concomitant power factor correction as claimed in claim 8 for use in connection with a three-phase power system, wherein each coil column has and even number of current collectors, each half thereof travelling in respective opposite directions.

11. The power-factor correction system for reactive power control and concomitant power factor correction as claimed in claim 1, wherein the line supplying power has a rated voltage, and wherein said fixed capacitance means comprises a single capacitor having a higher voltage rating than the rated voltage of the power supplying line.

12. The power-factor correction system for reactive power control and concomitant power factor correction as claimed in claim 6, wherein said control means includes a reversible electric motor in driving connection with said current collectors.

13. The power-factor correction system for reactive power control and concomitant power factor correction as claimed in claim 12, wherein said reversible electric motor is a single phase motor.

14. The power-factor correction system for reactive power control and concomitant power factor correction as claimed in claim 1, wherein said reversible electric motor is a polyphase motor.

15. The power-factor correction system for reactive power control and concomitant power factor correction as claimed in claim 12, wherein where variable control speed is used, said reversible electric motor is a D.C. motor, capable of developping a variable speed, and capable of dynamic braking.

16. The power-factor correction system for reactive power control and concomitant power factor correction as claimed in claim 12, further comprising automatic control circuitry controlling the operation of said electric motor, with recourse means to revert to manual operation.

17. The power-factor correction system for reactive power control and concomitant power factor correction as claimed in claim 5, further comprising a pre-boost autotransformer fed from said power supplying line, and having an output connected ahead of the secondary winding of said series transformer so as to act as a voltage range shifting device with respect to any voltage range applied to said one of said fixed capacitance and reactance means.

18. The power-factor correction system for reactive power control and concomitant power factor correction as claimed in claim 5, wherein said variable transformer includes a single sliding current collector, and a winding provided with a center tap.

19. The power-factor correction system for reactive power control and concomitant power factor correction as claimed in claim 1, wherein said line is a polyphase line, wherein said reactive power compensating means include multiphase reactive power compensating means connected to respective phases of said polyphase line, wherein said capacitance means is a fixed capacitance means including a plurality of capacitors connected to respective phases of said multiphase power compensating means, and said voltage applying means include multiphase voltage applying means connected to respective phases of said polyphase line.

20. The power-factor correction system for reactive power control and concomitant power factor correction as claimed in claim 5, wherein the power supplying line is a low voltage class ANSI 1.2 kV line, and wherein said fixed capacitance means is rated for a high voltage of the order of 15 kV, and further comprising a two-winding step-up transformer fed from said low voltage line having an output connected ahead of the secondary winding of said series transformer so as to act as a high voltage increasing device with respect to the voltage applied to said fixed capacitance means, whereby a very large reactive power becomes compensatable.

21. The power-factor correction system for reactive power control and concomitant power factor correction as claimed in claim 5, wherein the power supplying line has a voltage higher than the ANSI 1.2 kV class, wherein said primary winding of said series transformer is a low voltage winding, and wherein said variable transformer comprises two isolated windings, one winding being a primary high voltage winding connected across the high voltage power supplying line, the other winding being a secondary low voltage variable output winding feeding the primary winding of said series transformer.

22. The power-factor correction system for reactive power control and concomitant power factor correction as claimed in claim 5, wherein said variable transformer is a low-voltage autotransformer, and the power supplying line has a voltage higher than the ANSI 1.2 kV class, wherein the primary winding of said series transformer is a low voltage winding, and further comprising an isolated two-winding fixed ratio transformer, having a primary high voltage winding connected across the power supplying line, and having a secondary low voltage winding feeding said variable transformer.

23. The power-factor correction system for reactive power control and concomitant power factor correction as claimed in claim 5, further comprising a turn-on control system fed from said power supplying line for ensuring that the voltage delivered to said fixed capacitance means at the moment of power turn-on is set to a lowest available voltage, said turn-on control system comprising:
  voltage detection means, including regulation means responsive to the presence of line voltage on said line supplying power, for disconnecting said variable voltage transformer from said power supplying lines upon of absence of power, said variable voltage transformer thereby becoming a damping load across said series transformer primary winding, whereby said series transformer secondary winding acts as a primary winding, and said primary winding acts as a secondary winding, while said variable voltage transformer is disconnected from said power supplying line, and concurrently said voltage detection means disabling itself, disabling said regulation means, and disabling said power factor correcting means;
  enabling means responsive to restoration of power for setting said variable voltage transformer to its lowest voltage; and
  means operative subsequently to settling of said variable voltage transformer to said lowest voltage for reconnecting said variable voltage transformer to said power supplying line, and for subsequent restoration of said primary winding and of said secondary winding of said series transformer to their normal respective functions, and re-enabling of said regulation means, whereupon normal operation of said power-factor correction system is resumed.

24. The power-factor correction system for reactive power control and concomitant power factor correction as claimed in claim 1, further comprising
  sensing means coupled to said power supplying line for generating a signal indicative of the derivative of the square of current flowing in said line supplying power with respect to any wattless power in said load, and
  control means coupled to said sensing means and to said reactive power compensating means for regulating the compensating reactive power so that the derivative of the square of current flowing in the line supplying power with respect to said wattless power is always substantially zero, whereby said system is particularly suitable for non-sinusoidal voltages and currents, and losses in said line supplying power are being minimized.

25. The power factor correction system for reactive power control and concomitant power factor correction as claimed in claim 24, wherein said sensing means comprise
  sampling means for sampling said square of current flowing in said power supplying line and for sampling the compensating reactive power at a sampling frequency sufficiently high to detect any rate of change of said square of current with respect to said compensating reactive power,
  square of line current-to-time derivative measuring means, coupled to said power supplying line, and
  compensating reactive power-in-time derivative measuring means, said derivative measuring means being coupled to said reactive power compensating means, and
  logic circuitry including divider means connected to said derivative measuring means for obtaining a signal proportional to the derivative of said square of current with respect to said compensating reactive power.

26. The power-factor correction system for reactive power control and concomitant power factor correction as claimed in claim 25, wherein said square of line current-to-time derivative measuring means includes at least one square of line current measuring transducer coupled to said line supplying power, a first analog-to-digital converter coupled to said square of line current measuring transducer for digitizing the output of said square of line current measuring transducer at said sampling frequency, a first digital-to-analog converter postcoupled to said square of line current measuring transducer, first delay means postcoupled to said digital-to-analog converter, and having a delay equal to the inverse of said sampling frequency, a second analog-to-digital converter postcoupled to said first delay means for digitizing the output of said first delay means at said sampling frequency, and a first subtractor receiving on one input thereof the output of said first analog-to-digital converter, and receiving on the other input thereof the output of said second analog-to-digital converter.

27. The power factor correction system for reactive power control and concomitant power factor correction as claimed in claim 25, wherein said compensating reactive power-to-time derivative measuring means includes a wattless power transducer coupled to said reactive power compensating means, and a third analog-to digital converter coupled to said wattless power transducer for digitizing the output of said third analog-to-digital converter at said sampling frequency, a third digital-to-analog converter postcoupled to said wattless power transducer, second delay means postcoupled to said third digital-to-analog converter and having a delay equal to the inverse of said sampling frequency, a fourth analog-to-digital converter postcoupled to said second delay means for digitizing the output of said second delay means at said sampling frequency and a second subtractor receiving on one input thereof the output of said third analog-to-digital converter, and receiving on the other input thereof the output of said fourth analog-to-digital converter.

28. The power-factor correction system for reactive power control and concomitant power factor correction as claimed in claim 1 wherein said reactive power compensating means changes from an initial operating mode to a normally continuously progressing dynamic mode, and further comprising
  incipient resonance detection means connected to said line supplying power, and
  disabling means for stopping the progress of said reactive power compensating means in said dynamic mode upon said incipient resonance detection means detecting said incipient resonance, whereby said system is particularly suitable for non-sinusoidal voltages and currents.

29. The power-factor correction system for reactive power control and concomitant power factor correction as claimed in claim 28, wherein said voltage applying means include a series transformer having isolated primary and secondary windings, said secondary winding being connected in series with the given line voltage line so as to provide a feed voltage for said capacitance means, and a variable transformer fed from said line supplying power and feeding said primary winding of said series transformer with a first variable voltage, so as to, in turn, induce a second variable voltage in phase with said line supplying power in said secondary winding, regulation means including first sensing means for sensing any change in reactive power consumed by said load, and for producing a reference signal, second sensing means for sensing any change in the compensating reactive power, and for generating a feedback signal, and comparator means comparing the feedback signal to the reference signal resulting in an output in dependence of said feedback signal and of said reference signal so as to produce an error detection signal of a definite magnitude having a positive or negative sign, said variable transformer having control means accepting the output of said comparator means, said control means including a motor connected to said variable transformer, and including "raise" and "lower" circuitry means to raise and lower, respectively, the variable voltage obtained from said variable transformer, and further comprising disabling means for disabling operation of said variable transformer includes means for disabling operation of said "raise" circuitry, resonance suppression means including a series reactor inserted in said line supplying power, a normally closed contact of a power contactor normally short-circuiting said series reactor, said incipient resonant detection means including a resonance detection relay, said resonance detection relay having a first normally closed contact inserted in said "raise" circuitry means, said first normally closed contact being opened upon activation of said incipient resonance detection means, thereby inhibiting said variable voltage from being further raised.

30. The power-factor correction system for reactive power control and concomitant power factor correction as claimed in claim 29, wherein said motor has an energizing line, and wherein said resonance detection relay has a second normally open contact, and a resonance control relay in series with said second contact, said resonance control relay having a normally open resonance control relay contact, and further comprising a time delay relay having a predetermined delay time in series with said resonance control relay contact, said time delay relay having a time delay relay contact, said power contactor being in series with said time delay realy contact, said power contactor, upon being energized, after elapse of said delay time, removing the short from said series reactor inserted in said power supplying line, thereby permitting continuation and safe operation of said system free of any resonance crest danger.

* * * * *

UNITED STATES PATENT AND TRADEMARK OFFICE
CERTIFICATE OF CORRECTION

PATENT NO. : 4,672,298

DATED : June 09, 1987

INVENTOR(S) : Frederick Rohatyn

It is certified that error appears in the above-identified patent and that said Letters Patent is hereby corrected as shown below:

On page 1, under [76], change "11375" to --11357--;
On column 5, line 40, correct the spelling of "concern";
On column 5, line 63, change "23" to --12--;
On column 7, line 28, delete "to";
On column 9, line 15, correct the spelling of "numerical";
On column 9, line 61, correct the spelling of "capacity";
On column 11, line 29, change "127" to --127'--;
On column 11, line 41, change "127" to --127'--;
On column 13, line 27, change "cor." to --core--;
On column 15, line 29, change "on" to --or--;
On column 17, line 59, correct the spelling of "concomitant";
On column 18, line 13, correct the spelling of "offset";
On column 19, line 31, correct the spelling of "concomitant";
On column 19, line 34, change "and" to --an--;
In the drawing FIG. 5, FIG. 8A, FIG. 10, FIG. 11, FIG. 12, FIG. 13 and FIG. 14, should appear as shown on the attached sheets.

Signed and Sealed this

Fourteenth Day of February, 1989

Attest:

DONALD J. QUIGG

Attesting Officer     Commissioner of Patents and Trademarks

UNITED STATES PATENT AND TRADEMARK OFFICE
CERTIFICATE OF CORRECTION

PATENT NO. : 4,672,298

DATED : June 09, 1987

INVENTOR(S) : Frederick Rohatyn

Page 2 of 6

It is certified that error appears in the above-identified patent and that said Letters Patent is hereby corrected as shown below:

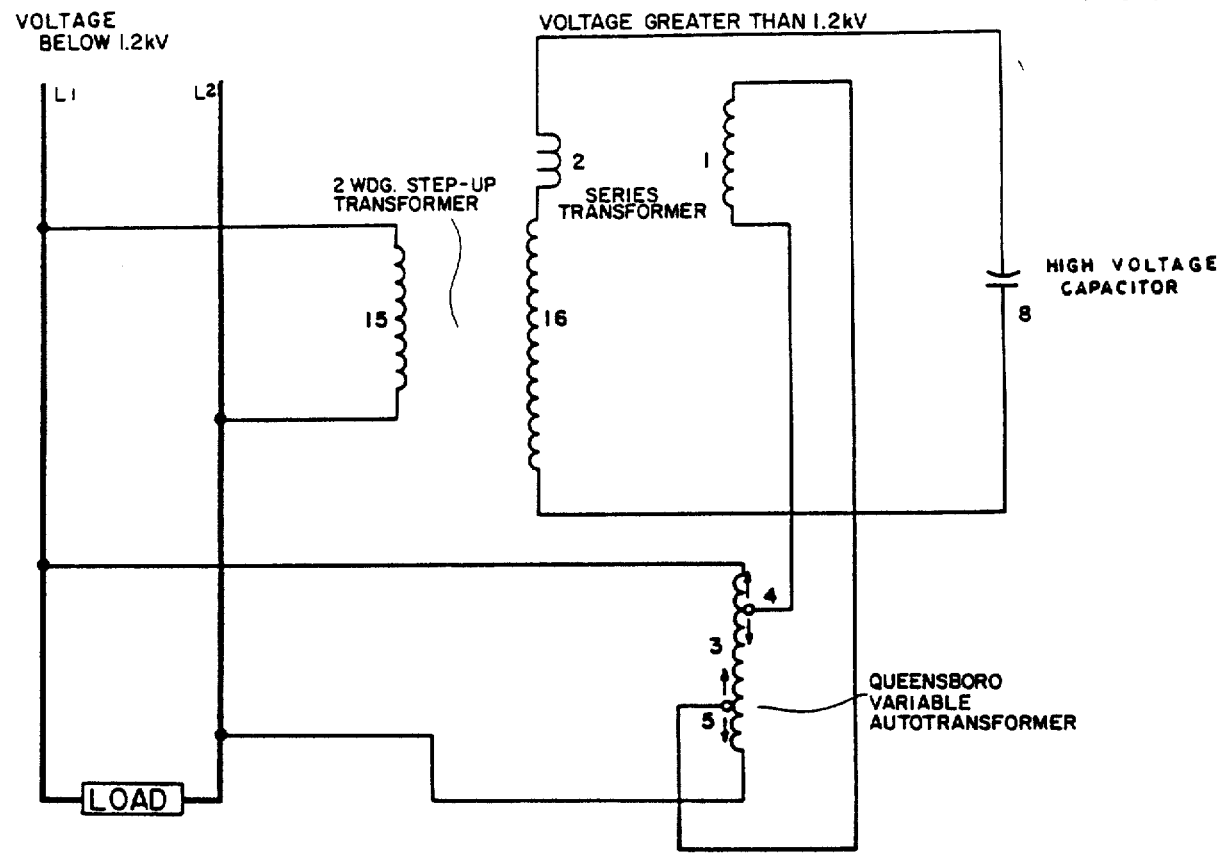

FIG. 5

UNITED STATES PATENT AND TRADEMARK OFFICE
CERTIFICATE OF CORRECTION

PATENT NO. : 4,672,298

DATED : June 09, 1987

INVENTOR(S) : Frederick Rohatyn

Page 3 of 6

It is certified that error appears in the above-identified patent and that said Letters Patent is hereby corrected as shown below:

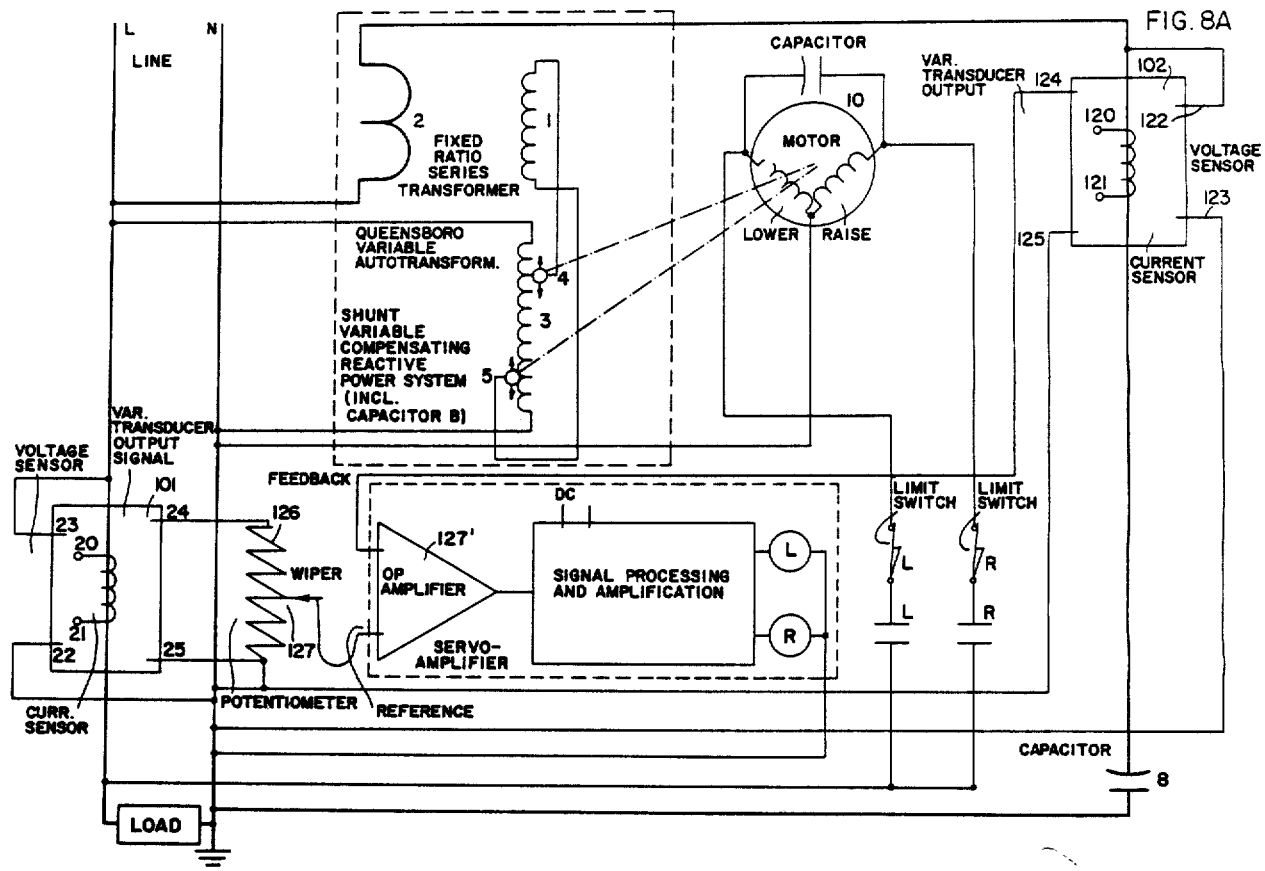

FIG. 8A

UNITED STATES PATENT AND TRADEMARK OFFICE
CERTIFICATE OF CORRECTION

PATENT NO. : 4,672,298

DATED : June 09, 1987

INVENTOR(S) : Frederick Rohatyn

It is certified that error appears in the above-identified patent and that said Letters Patent is hereby corrected as shown below:

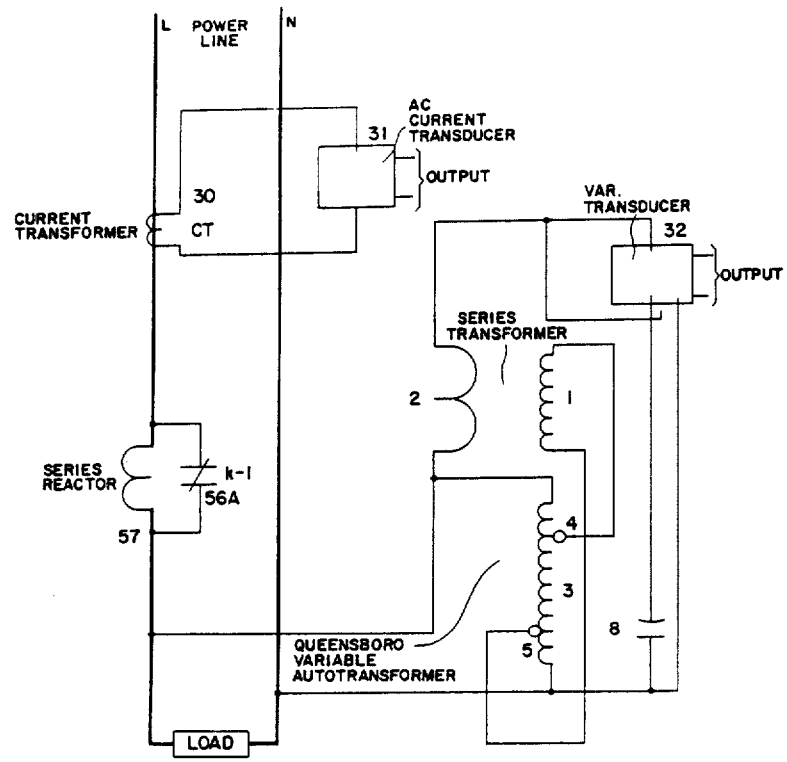

FIG. 10

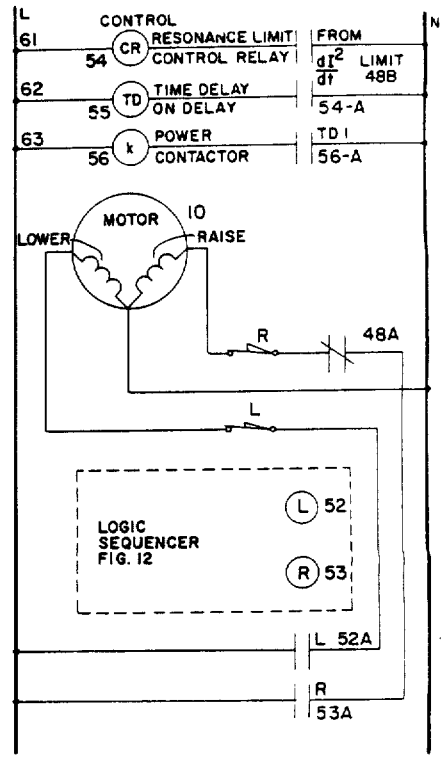

FIG. 11

UNITED STATES PATENT AND TRADEMARK OFFICE
CERTIFICATE OF CORRECTION

PATENT NO. : 4,672,298

DATED : June 09, 1987

INVENTOR(S) : Frederick Rohatyn

It is certified that error appears in the above-identified patent and that said Letters Patent is hereby corrected as shown below:

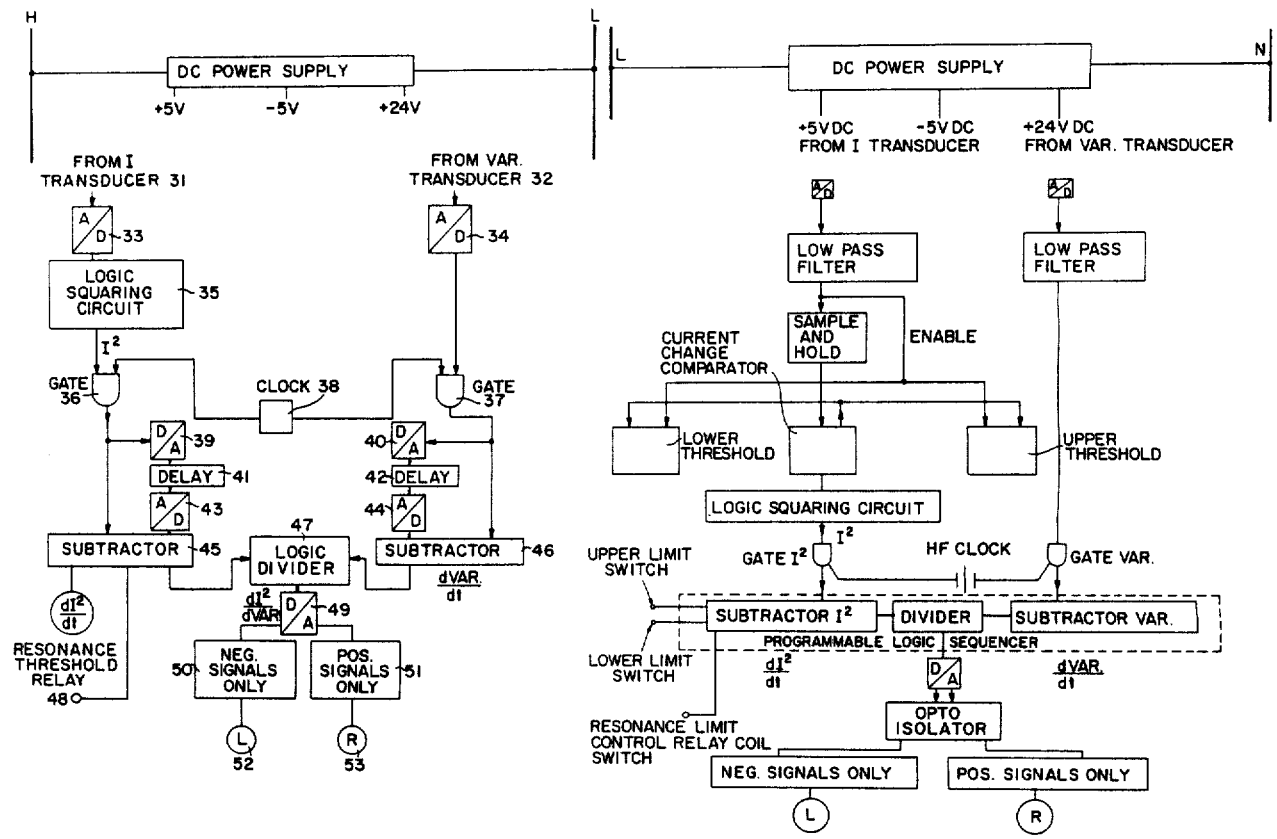

FIG. 12

FIG. 13

UNITED STATES PATENT AND TRADEMARK OFFICE
CERTIFICATE OF CORRECTION

PATENT NO. : 4,672,298

DATED : June 09, 1987

INVENTOR(S) : Frederick Rohatyn

It is certified that error appears in the above-identified patent and that said Letters Patent is hereby corrected as shown below:

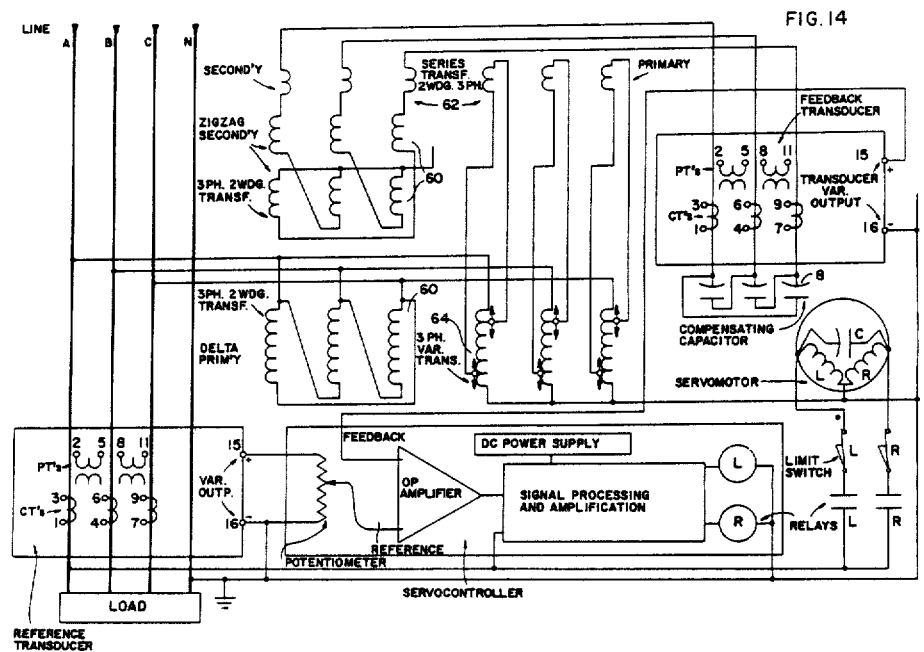

FIG. 14